United States Patent
Lind

(10) Patent No.: US 10,033,264 B2
(45) Date of Patent: Jul. 24, 2018

(54) BULK CAPACITOR SWITCHING FOR POWER CONVERTERS

(71) Applicant: Infineon Technologies Austria AG, Villach (AT)

(72) Inventor: Anders Lind, San Jose, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/141,998

(22) Filed: Apr. 29, 2016

(65) Prior Publication Data

US 2017/0317594 A1    Nov. 2, 2017

(51) Int. Cl.
*H02M 1/15* (2006.01)
*H02M 1/36* (2007.01)

(52) U.S. Cl.
CPC .............. *H02M 1/15* (2013.01); *H02M 1/36* (2013.01)

(58) Field of Classification Search
CPC .. H02M 1/15; H02M 1/36; H02M 1/14; H02J 3/01
See application file for complete search history.

(56) References Cited

U.S. PATENT DOCUMENTS

| | | | |
|---|---|---|---|
| 5,563,487 A | 10/1996 | Davis | |
| 5,663,634 A | 9/1997 | Fawal et al. | |
| 5,880,942 A * | 3/1999 | Leu | H02M 1/36 363/131 |
| 5,959,442 A | 9/1999 | Hallberg et al. | |
| 6,069,800 A * | 5/2000 | Cross | H02M 1/4258 363/20 |
| 6,175,223 B1 | 1/2001 | Martinez et al. | |
| 6,531,856 B2 * | 3/2003 | Sakiyama | H02J 7/345 323/288 |
| 6,611,132 B2 | 8/2003 | Nakagawa et al. | |
| 6,713,974 B2 | 3/2004 | Patchornik et al. | |
| 6,788,557 B2 * | 9/2004 | Phadke | H02M 3/33569 307/103 |
| 7,202,653 B2 | 4/2007 | Pai | |
| 7,205,827 B2 | 4/2007 | Leung et al. | |
| 7,221,128 B2 * | 5/2007 | Usui | H02M 1/36 323/207 |
| 7,279,872 B2 | 10/2007 | Hackner et al. | |

(Continued)

FOREIGN PATENT DOCUMENTS

EP    1376836 A2    1/2004

OTHER PUBLICATIONS

"AIC1737, Low Output Voltage, 300mA Low Dropout Linear Regulator," Analog Integrations Corporation, Spec No. DS-1737-00, Aug. 6, 2000, 5 pp.

(Continued)

*Primary Examiner* — Kyle J Moody
(74) *Attorney, Agent, or Firm* — Shumaker & Sieffert, P.A.

(57) ABSTRACT

In one example, a circuit includes a voltage rail, a reference node, a first capacitor, and a capacitor module. The first capacitor is coupled to the voltage rail and to the reference node. The capacitor module includes a second capacitor and a switching unit. The switching unit is configured to operate in a closed state and an open state. The switching unit couples the second capacitor in parallel with the first capacitor in the closed state. The switching unit decouples the second capacitor from the first capacitor in the open state.

18 Claims, 22 Drawing Sheets

(56) References Cited

U.S. PATENT DOCUMENTS

| | | | |
|---|---|---|---|
| 7,330,364 B2 | 2/2008 | Lynch | |
| 7,760,524 B2* | 7/2010 | Matthews | H02M 1/10 363/45 |
| 7,961,483 B2 | 6/2011 | Huynh et al. | |
| 8,698,472 B2 | 4/2014 | Yang et al. | |
| 8,866,460 B2 | 10/2014 | Huang et al. | |
| 9,295,116 B2* | 3/2016 | Sanders | H05B 33/0815 |
| 9,602,009 B1* | 3/2017 | Baurle | H02M 1/10 |
| 9,629,218 B1* | 4/2017 | Del Carmen, Jr. | H05B 33/0884 |
| 2009/0103337 A1 | 4/2009 | Matthews | |
| 2012/0319484 A1 | 12/2012 | Scaldaferri et al. | |
| 2014/0126254 A1 | 5/2014 | Al-Shyoukh et al. | |
| 2014/0153294 A1 | 6/2014 | Deboy et al. | |
| 2014/0346962 A1 | 11/2014 | Sanders et al. | |
| 2015/0171743 A1 | 6/2015 | Yeon et al. | |
| 2016/0116925 A1 | 4/2016 | Freeman et al. | |
| 2017/0294830 A1* | 10/2017 | Ye | H02M 1/14 |
| 2017/0294831 A1* | 10/2017 | Dai | H02M 1/14 |
| 2017/0317582 A1* | 11/2017 | Leong | H02M 3/07 |

OTHER PUBLICATIONS

"Nichicon ULV2W3R3MNL1GS," Digi-Key Electronics, retrieved from http://www.digikey.com/product-detail/en/ULV2W3R3MN-L1GS/493-6744-2-ND/3664124 on Apr. 28, 2016, 2 pp.

"Rubycon 100ZLH56MEFC10X12.5," Digi-Key Electronics, retrieved from http://www.digikey.com/product-detail/en/100ZLH56MEFC10X12.5/1189-1034-ND/3133961 on Apr. 28, 2016, 2 pp.

"TJ49150, 1.5A Very Low Input/Output Voltage Ultra Low Dropout Linear Regulator," HTC Korea, Jul. 2011, 11 pp.

"United Chemi-Con EKXG401ELL220MK20S," Digi-Key Electronics, retrieved from http://www.digikey.com/product-detail/en/EKXG401ELL220MK20S/565-1463-NDT755979 on Apr. 28, 2016, 2 pp.

Brown, "Chapter 1: An Introduction to the Linear Regulator," Power Sources and Supplies, Newnes Press, May 20, 2008, 12 pp.

Li et al., "Analysis and Design of a Single-Stage Parallel AC-to-DC Converter," IEEE Transactions on Power Electronics, vol. 24, No. 12, Dec. 2009, 14 pp.

Zhang et al., "Single-Stage Input-Current-Shaping Technique with Voltage-Doubler-Rectifier Front End," IEEE Transactions on Power Electronics, vol. 16, No. 1, Jan. 2001, 9 pp.

Office Action from U.S. Appl. No. 15/142,059, dated Dec. 15, 2017, 21 pp.

Response to Office Action dated Dec. 15, 2017, from U.S. Appl. No. 15/142,059, filed Feb. 13, 2018, 13 pp.

Notice of Allowance from U.S. Appl. No. 15/142,059, dated Mar. 28, 2018, 10 pages.

* cited by examiner

BULK CAPACITOR SWITCHING FOR POWER CONVERTERS

TECHNICAL FIELD

This disclosure relates to alternating current (AC) to direct current (DC) adapters that receive an AC voltage and output a DC voltage.

BACKGROUND

Alternating current (AC) to direct current (DC) adapters may include a rectifier that receives an AC voltage and outputs a rectified AC voltage and a DC to DC power converter that receives the rectified AC voltage and outputs to a DC voltage suitable for electronic devices, such as laptops, mobile devices, tablets, and the like. However, the rectified AC voltage may include voltage ripples and a low peak voltage that reduces an efficiency of the DC to DC power converter, thereby resulting in a reduced efficiency of the AC to DC adapter.

SUMMARY

In general, this disclosure is directed to techniques for reducing a physical size while improving the efficiency of alternating current (AC) to direct current (DC) adapters. In some examples, one or more techniques may permit use of capacitors having a low voltage rating rather than a high voltage rating to reduce a voltage ripple of a rectified AC voltage, thereby reducing a physical size of a resulting AC to DC adapter. For instance, an AC to DC adapter may selectively switch a capacitor having a low voltage rating (e.g., ~100 volts) and a high capacitance (e.g., ~56 μF) when a voltage of the rectified AC voltage is within a voltage threshold (e.g., ~80% of a voltage rating of the capacitor). In some examples, one or more techniques may increase a voltage received by a DC to DC power converter of an AC to DC adapter to improve the overall efficiency of the AC to DC adapter. For instance, an AC to DC adapter may selectively switch a series string of capacitors such that the DC to DC power converter of the AC to DC adapter receives a peak voltage that is greater than a peak voltage of the AC voltage received by the AC to DC adapter.

In one example, a circuit includes a voltage rail, a reference node, a first capacitor, and a capacitor module. The first capacitor is coupled to the voltage rail and to the reference node. The capacitor module includes a second capacitor and a switching unit. The switching unit is configured to operate in a closed state and an open state. The switching unit couples the second capacitor in parallel with the first capacitor in the closed state. The switching unit decouples the second capacitor from the first capacitor in the open state.

In another example, a method includes: estimating, by a circuit, a voltage between a voltage rail and a reference node. The method further includes determining, by the circuit, whether the voltage between the voltage rail and the reference node exceeds a voltage threshold in response to estimating the voltage between the voltage rail and the reference node. The method further includes increasing, by the circuit, a capacitance between the voltage rail and the reference node by selectively coupling, by the circuit, a capacitor to the voltage rail and to the reference node in response to determining that the voltage between the voltage rail and the reference node does not exceed the voltage threshold.

In another example, a system includes a voltage source, a first capacitor, a capacitor module, and a load. The load is coupled to the voltage rail and to the reference node. The voltage source is configured to supply a DC voltage to a voltage rail and a reference node. The first capacitor is configured to reduce a voltage ripple of the DC voltage. The first capacitor is coupled to the voltage rail and to the reference node. The capacitor module is configured to reduce the voltage ripple of the DC voltage. The capacitor module includes a second capacitor and a switching unit. The switching unit is configured to operate in a closed state and an open state. The switching unit couples the second capacitor in parallel with the first capacitor in the closed state. The switching unit decouples the second capacitor from the first capacitor in the open state.

In another example, a circuit includes an AC voltage source, voltage rail, reference rail, first capacitor, second capacitor, and switching unit. The AC voltage source is configured to supply voltage in a first direction during a first half of a cycle and supply voltage in a second direction during a second half of the cycle, the first direction being opposite from the second direction. The first capacitor includes a first node and a second node. The first node of the first capacitor is coupled to the voltage rail. The second capacitor includes a first node coupled to the second node of the first capacitor and a second node coupled to the reference rail. The switching unit is configured to operate the circuit in a first state and a second state. During the first state of the circuit, the voltage in the first direction supplied by the AC voltage source charges the first capacitor and the voltage in the second direction supplied by the AC voltage source charges the first capacitor. During the second state of the circuit, the voltage in the first direction supplied by the AC voltage source charges the first capacitor and the voltage in the second direction supplied by the AC voltage source charges the second capacitor.

In another example, a circuit includes an AC voltage source, voltage rail, reference rail, first capacitor, second capacitor, rectifier, switching unit, and capacitor module. The first capacitor includes a first node and a second node. The first node of the first capacitor is coupled to the voltage rail. The second capacitor includes a first node coupled to the second node of the first capacitor and a second node coupled to the reference rail. The rectifier is configured to receive an AC voltage from the AC voltage source and output a rectified voltage. The switching unit is configured to receive the rectified voltage and selectively switch the first capacitor and the second capacitor such that a peak voltage of a series string including the first capacitor and the second capacitor is greater than a peak voltage of the AC voltage. The capacitor module is configured to selectively increase a capacitance between the voltage rail and the reference rail in response to determining that the rectified voltage does not exceed a voltage threshold.

In another example, a system includes an AC voltage source, an adapter, and a load. The adapter includes a rectifier, a series string, and a switching unit. The rectifier is configured to receive an AC voltage from the AC voltage source and supply a rectified voltage to a voltage rail and a reference rail. The series string includes a first capacitor and second capacitor. The series string is coupled to the voltage rail and to the reference rail. The switching unit is configured to selectively switch the first capacitor and the second capacitor such that a peak voltage of the series string including the first capacitor and the second capacitor is greater than a peak voltage of the AC voltage from the AC voltage source. The capacitor module is configured to reduce an AC voltage ripple of the series string including the first capacitor and the second capacitor. The converter is configured to receive the voltage of the series string including the first capacitor and the second capacitor and output a DC voltage. The load is configured to receive the DC voltage from the converter.

Details of these and other examples are set forth in the accompanying drawings and the description below. Other features, objects, and advantages will be apparent from the description and drawings, and from the claims.

DETAILED DESCRIPTION

Figure 1:
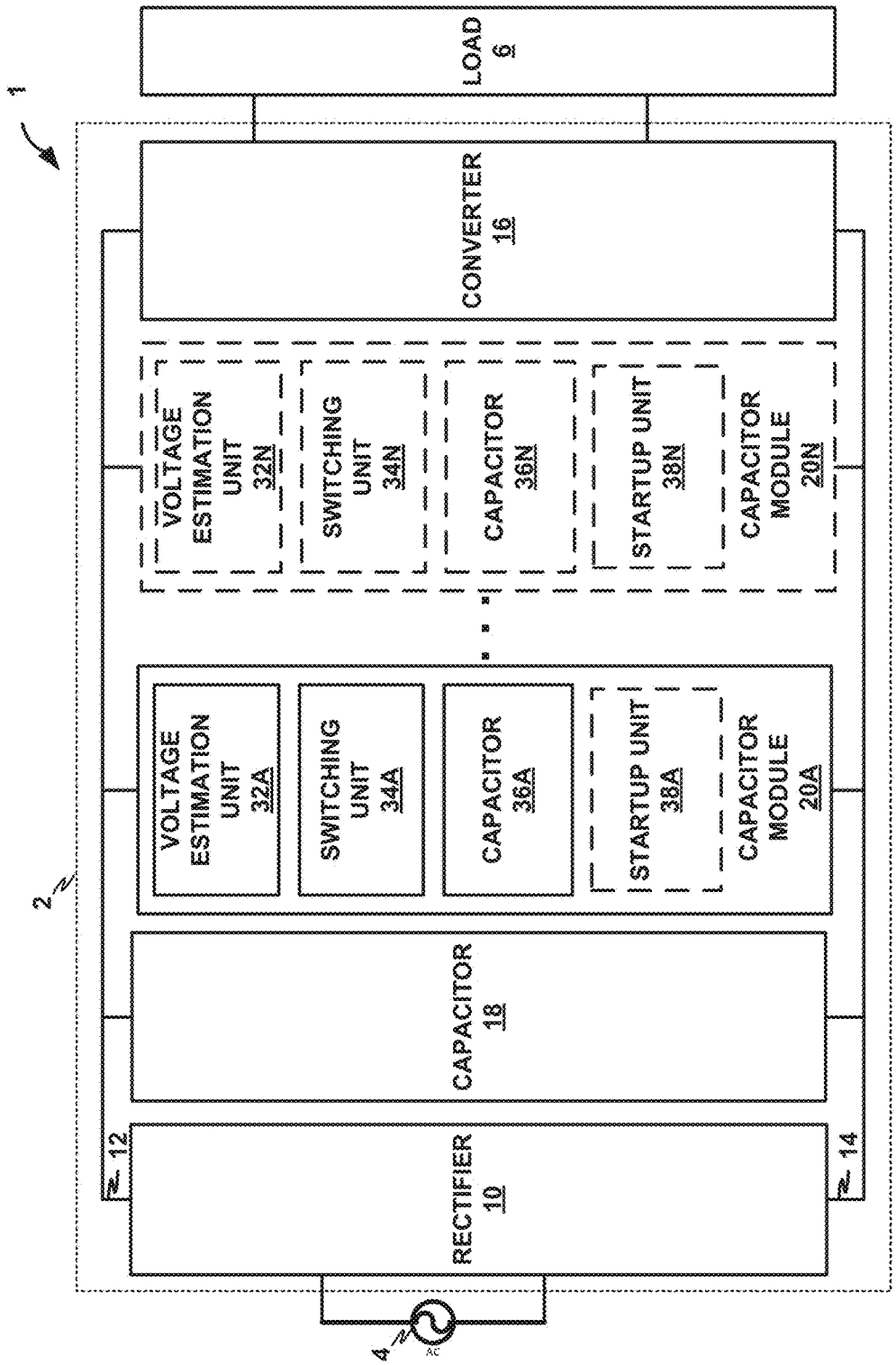
FIG. 1 is a block diagram illustrating an example capacitor switching system, in accordance with one or more techniques of this disclosure.

Some systems may use a bulk capacitor to reduce a voltage ripple of a rectified AC voltage output by a rectifier receiving an alternating current (AC). However, such bulk capacitors may require both a high voltage rating to support a high AC voltage as well as a high capacitance to support a low AC voltage. For instance, a bulk capacitor may be designed to have both a high voltage rating (e.g., 400 volts) to permit a high AC voltage (e.g., ~230 $V_{AC}$) and a high capacitance (e.g., ~22 µF) to permit a low AC voltage (e.g., ~120 $V_{AC}$). Such bulk capacitors may be an inefficient design since the high capacitance is not needed at high AC voltages and the high voltage rating is not needed at low AC voltages. Moreover, such bulk capacitors may be physically large, thereby resulting in physically large AC to DC adapters ("adapters") that convert an AC voltage to a direct current (DC) voltage suitable for use by electronic devices.

In some examples, selectively switching a capacitor may permit reducing a volume of the adapter while reducing the voltage ripple of a rectified. AC voltage. For instance, at a high AC voltage (e.g., ~230 $V_{AC}$), an adapter may use a first capacitor to reduce the voltage ripple of the rectified AC voltage. At the high AC voltage, the first capacitor, by itself, may store enough energy to sufficiently reduce the voltage ripple of the rectified AC voltage, thereby permitting efficient use of the rectified AC voltage by a DC-DC converter. Then, at a low AC voltage (e.g., ~120 $V_{AC}$), the first capacitor, by itself, may not store enough energy to sufficiently reduce the voltage ripple of the rectified AC voltage. So, the adapter may use both a first capacitor and a second capacitor to reduce a voltage ripple of the rectified AC voltage to permit efficient use of the rectified AC voltage by the DC-DC converter. More specifically, the adapter may selectively switch in the second capacitor having a low voltage rating (e.g., ~100 volts) and a high capacitance (e.g., ~56 µF) when a voltage of the rectified AC voltage is within a percentage (e.g., ~80%) of the voltage rating of the second capacitor.

In some examples, use of a first capacitor having a high voltage rating and low capacitance and a second capacitor having a low voltage rating and high capacitance may significantly reduce a volume of the adapter. For instance, a first capacitor having a voltage rating of ~450 volts and capacitance of ~3.3 µF and a second capacitor having a voltage rating of ~100 volts and a capacitance of ~56 µF may have a total volume that is ~33% less than a bulk capacitor having a voltage rating of ~400 volts and a capacitance of ~22 µF, while providing a smaller voltage ripple (e.g., a lower trough voltage of 88 volts compared to ~81 volts).

Additionally, or alternatively, a series string of capacitors may be used to increase the voltage to further improve efficiency of the DC-DC converter, thereby improving an overall efficiency of the adapter. That is, rather than using a single capacitor to reduce a voltage ripple of the rectified AC voltage, two or more capacitors may be selectively charged in parallel by the rectified AC voltage and then discharged as a series string, thereby providing a higher peak voltage which may improve an efficiency of the DC-DC converter.

FIG. 1 is a block diagram illustrating an example capacitor switching system 1, in accordance with one or more techniques of this disclosure. As illustrated in the example of FIG. 1, capacitor switching system 1 may include an adapter 2 connected to AC voltage source 4 and load 6.

AC voltage source 4 may be an output from any suitable electrical grid. For example, the output may be ~120 $V_{AC}$ at ~60 Hz, ~230 $V_{AC}$ at ~50 Hz, or another voltage and frequency. In some examples, AC voltage source 4 may be configured to supply a voltage in a first direction during a first half of a cycle and supply voltage in a second direction during a second half of the cycle, the first direction being opposite from the second direction. For instance, AC voltage source 4 may be configured to supply a sine wave that includes a positive current (e.g., first direction) flowing from a first node of AC voltage source 4 to a second node of AC voltage source 4 during a first half (e.g., 0 to $\pi$) of a cycle of the sine wave and a negative current (e.g., second direction) flowing from the second node of AC voltage source 4 to the first node of AC voltage source 4 during a second half (e.g., $\pi$ to $2\pi$) of the cycle of the sine wave.

Load 6 may be any suitable device configured to use a DC voltage output by adapter 2. In some examples, load 6 may include an electronic device. Examples of electronic devices may include, but are not limited to, mobile devices (e.g., smart phones, tablets, wearable devices, or another mobile device), computing devices e.g., laptop, notebook, portable personal computer, or another computing device), batteries (e.g., nickel-cadmium, lead-acid, nickel-metal hydride, nickel-zinc, silver-oxide, lithium-ion, lithium polymer, or another battery), speakers, or another electronic device.

Adapter 2 may be any configured to supply a DC voltage suitable to operate Load 6. For instance, load 6 may include a mobile device configured to receive 5 $V_{DC}$. As such, adapter 2 may regulate a DC voltage output to the electronic device to 5 $V_{DC}$+/−5% (e.g., 4.75 $V_{DC}$ to 5.25 $V_{DC}$). In some instances, load 6 may include a computing device configured to receive 12 $V_{DC}$. As such, adapter 2 may regulate a DC voltage output to the electronic device to 12 $V_{DC}$+/−5% (e.g., 11.4 $V_{DC}$ to 12.6 $V_{DC}$). In some examples, adapter 2 may provide electronic (e.g., galvanic) isolation between AC voltage source 4 and load 6. As shown, adapter 2 may include rectifier 10, capacitor 18, capacitor modules 20A-N (collectively, "capacitor modules 20"), and converter 16. In some examples, adapter 2 may include an enclosure (e.g., plastic) that contains rectifier 10, capacitor 18, capacitor modules 20A-N (collectively, "capacitor modules 20"), and converter 16.

Rectifier 10 may be configured to receive an AC voltage from AC voltage source 4 and to provide a rectified AC voltage to one or more other components of capacitor switching system 1. For example, rectifier 10 may be configured to supply electrical power to capacitor 18. Examples of rectifier 10 may include, but are not limited to, single-phase rectifier (e.g., bridge, half wave, full wave, or another single-phase rectifier), three-phase rectifier (e.g., half wave, full wave, bridge, or another three-phase rectifier), or another device configured to supply electrical power to capacitor 18.

Converter 16 may include a switched-mode power converter that converts a rectified AC voltage output by rectifier 10 to a DC voltage. Examples of switched-mode power converter may include, but are not limited to, flyback, forward, buck-boost, buck, boost, Ćuk, or another switched-mode power converter. For instance, a flyback power converter of converter 16 may increase and/or decrease a rectified AC voltage output by rectifier 10. In some examples, the switched-mode power converter included in converter 16 may be configured to receive the rectified AC voltage at a first voltage and output a DC voltage at a second voltage. For instance, the switched-mode power converter included in converter 16 may receive, from rectifier 10, a rectified AC voltage at a first voltage (e.g., ~110 $V_{AC}$) that has a voltage ripple reduced by capacitor 18 (and capacitors 36) and output a DC voltage, to load 6, at a second voltage (e.g., ~5 $V_{DC}$, ~12 $V_{DC}$, or another voltage). In some examples, converter 16 may include an isolation stage. For example, converter 16 may provide galvanic isolation, for instance, by using a transformer.

Capacitor 18 may comprise an electrical component configured to store electrical energy in an electric field. Examples of an electrical component configured to store electrical energy in an electric field may include, but are not limited to, ceramic capacitors, film capacitors, electrolytic capacitors (e.g., aluminum, tantalum, niobium, or another electrolytic capacitor), super capacitors (e.g., double layer, pseudocapacitors, hybrid capacitors, or another super capacitor), mica capacitors, or another electrical component configured to store electrical energy in an electric field. For instance capacitor 18 may be an aluminum electrolytic capacitor having a voltage rating of ~400 volts and a capacitance of ~2.2 μF. Although capacitor 18 may be described as a single capacitor, capacitor 18 may be an array of capacitive elements. For instance, capacitor 18 may be an array of capacitive elements coupled in parallel and/or series. In some instances, each capacitive element may be a discrete component, while in other instances, each one of the capacitive elements may be contained within a single package (e.g., capacitor array).

In some examples, capacitor 18 may comprise a combination of parasitic components of capacitor switching system 1. For instance, capacitor 18 may store electrical energy in one or more electric fields of capacitor switching system 1. Such electric fields may be formed, for instance, between voltage rail 12 and reference node 14, in one or more components of converter 16, between conductors (e.g., wires) connecting capacitor switching system 1, between traces (e.g., printed circuit board traces) connecting capacitor switching system 1, or other components of switching system 1.

Capacitor modules 20 may be configured to reduce a voltage ripple between voltage rail 12 and reference node 14. It should be understood that capacitor switching system 1 may utilize any suitable number of capacitor modules 20. For instance, capacitor switching system 1 may include capacitor module 20A and omit capacitor modules 20B-N. In some instances, capacitor switching system 1 may include more than one of capacitor modules 20, for instance, capacitor modules 20A-N.

Although the following describes capacitor module 20A, it should be understood that the description of capacitor module 20A may apply to each of capacitor modules 20W-20N. For example, capacitor modules 20 may be substantially identical. For instance, each one of capacitor modules 20 may include a voltage estimation unit similar to voltage estimation unit 32A, a switching unit similar to switching unit 34A, and a capacitor similar to capacitor 36A. In some examples, capacitor modules 20 may be different. For instance, capacitor module 20A may include startup unit 38A while capacitor module 20N may omit startup unit 38N. As illustrated in the example of FIG. 1, capacitor module 20A may include voltage estimation unit 32A, switching unit 34A, and capacitor 36A. In some examples, capacitor module 20A may optionally include startup unit 38A. It should be understood that although FIG. 1 shows that each one of capacitor modules 20 may include a respective startup unit 38, in some examples, a single startup unit may be used to startup each one of capacitor modules 20. For instance, startup unit 38A may be included and used to startup each of capacitor modules 20A-N while startup units 38B-N are omitted.

Capacitor 36A may comprise an electrical component configured to store electrical energy in an electric field. For instance capacitor 36A may be an aluminum electrolytic capacitor having a voltage rating of ~100 volts and a capacitance of ~56 µF.

Switching unit 34A may include a switching element. Examples of switching elements may include, but are not limited to, silicon controlled rectifier (SCR), a Field Effect Transistor (FET), and bipolar junction transistor (BJT). Examples of FETs may include, but are not limited to, junction field-effect transistor (JFET), metal-oxide-semiconductor FET (MOSFET), dual-gate MOSFET, insulated-gate bipolar transistor (IGBT), any other type of FET, or any combination of the same. Examples of MOSFETS may include, but are not limited to, PMOS, NMOS, DMOS, or any other type of MOSFET, or any combination of the same. Examples of BJTs may include, but are not limited to, PNP, NTN, heterojunction, or any other type of BJT, or any combination of the same. It should be understood that the switching element of switching unit 34A may be a high side switch or low side switch. Additionally, although examples may illustrate switching unit 34A using a voltage-controlled element, in some examples, switching unit 34A may use a current-controlled element. Examples of current-controlled elements may include, but are not limited to, gallium nitride (GaN) MOSFETs, BJTs, or other current-controlled elements.

In some examples, startup unit 38A may selectively couple capacitor 36A during a startup operation of capacitor switching system 1 to permit, for instance, a boot operation of a microcontroller and/or logical components of capacitor switching system 1. Initially, startup unit 38A may couple capacitor 36A to voltage rail 12 and reference node 14. For instance, a switch (e.g., depletion-mode field-effect transistor) of startup unit 38A that operates in a closed state at a zero control voltage may couple capacitor 36A to voltage rail 12 and reference node 14. As used herein, a closed state may refer to a state that the switch permits current to flow bi-directionally.

Next, startup unit 38A may estimate a voltage of capacitor 36A in response to coupling capacitor 36A to voltage rail 12 and to reference node 14. For instance, a voltage divider of startup unit 38A may divide a voltage of capacitor 36A. In some instances, a voltage divider of startup unit 38A may divide a voltage of capacitor 18. Further, startup unit 38A may selectively couple capacitor 36A to voltage rail 12 and to reference node 14. For instance, the voltage divider of startup unit 38A may divide the voltage of capacitor 36A such that the switch operates in an open state when a voltage of capacitor 36A exceeds a de-rated voltage (e.g., 80%) of a voltage rating of capacitor 36A. As used herein, an open state may refer to a state that the switch reduces or prevents a current flow in one or two directions. For example, an open state may refer to a state that the switch reduces or prevents a current flow in one direction but permits current flow in another direction (e.g., unidirectional current flow). That is, the switch that is operating in the open state may permit capacitor 36A to discharge while preventing capacitor 36A from being charged.

In instances where startup unit 38A is omitted or specifically configured, switching unit 34A may reduce an inrush current of capacitor switching system 1. For example, switching unit 34A may couple capacitor 36A to voltage rail 12 and reference node 14 after a charging of capacitor 18. That is, during a startup operation of capacitor switching system 1, capacitor 18 may have a large inrush current. Then, after capacitor 18 substantially charges, thereby reducing the inrush current, switching unit 34A may switch in capacitor 36A. In this manner, capacitor switching system 1 may have a lower inrush current during a startup operation. In some examples, switching unit 34A may be configured to switch according to a pulse width modulation (PWM) signal. For instance, switching unit 34A may operate in a closed state during a first portion of a cycle (e.g., high) and may operate in an open state during a second portion of a cycle (e.g., low).

Voltage estimation unit 32A may estimate a voltage between voltage rail 12 and reference node 14 using any suitable techniques. For example, voltage estimation unit 32A may estimate the voltage between voltage rail 12 and reference node 14 using a voltage of capacitor 36A. In some examples, voltage estimation unit 32A may estimate the voltage between voltage rail 12 and reference node 14 using a voltage of capacitor 18. In some examples, voltage estimation unit 32A may estimate the AC voltage received by adapter 2 directly from AC voltage source 4. In some examples, voltage estimation unit 32A may estimate the voltage between voltage rail 12 and reference node 14 using a rectified AC voltage output from rectifier 10. For instance, voltage estimation unit 32A may directly detect the rectified AC voltage from rectifier 10. In some examples, voltage estimation unit 32A may estimate the voltage between voltage rail 12 and reference node 14 indirectly using a voltage of a transformer winding of a transformer used by converter 16 (e.g., a flyback transformer).

In response to voltage estimation unit 32A estimating the voltage between voltage rail 12 and reference node 14, voltage estimation unit 32A may determine whether the voltage between voltage rail 12 and reference node 14 exceeds a voltage threshold. In some examples, the voltage threshold may be a de-rated portion or a percentage of a full voltage rating of capacitor 36A. For instance, voltage estimation unit 32A may determine that the voltage between voltage rail 12 and reference node 14 exceeds the voltage threshold if the estimated voltage is greater than ~80%, ~90%, ~100%, or another defined percentage of a voltage rating of capacitor 36A and voltage estimation unit 32A may determine that the voltage between voltage rail 12 and reference node 14 does not exceed the voltage threshold if the estimated voltage is less than ~80%, ~90%, ~100%, or another defined percentage of a voltage rating of capacitor 36A. In some examples, hysteresis may be used. For instance, as the voltage between voltage rail 12 and reference node 14 decreases the voltage threshold may be de-rated by a first amount (e.g., 5% to 50%) of the voltage rating of capacitor 36A and as the voltage between voltage rail 12 and reference node 14 increases the voltage threshold he may be further reduced from the first amount by a hysteresis window (e.g., ~1% to 50%) of the voltage rating of capacitor 36A.

In response to voltage estimation unit 32A determining that the voltage between voltage rail 12 and reference node 14 exceeds the voltage threshold, switching unit 34A may operate in an open state, thereby preventing capacitor 36A from exceeding the voltage threshold. For example, switching unit 34A may operate in an open state to decouple capacitor 36A to voltage rail 12 and to reference node 14 in response to voltage estimation unit 32A determining that the voltage between voltage rail 12 and reference node 14 exceeds a voltage threshold (e.g., ~80% of the voltage rating of capacitor 36A).

On the other hand, switching unit 34A may increase a capacitance between voltage rail 12 and the reference node 14 in response to voltage estimation unit 32A determining that the voltage between voltage rail 12 and reference node 14 does not exceed the voltage threshold. For example, switching unit 34A may increase the capacitance between voltage rail 12 and the reference node 14 by selectively coupling capacitor 36A to voltage rail 12 and to reference node 14. More specifically, switching unit 34A may operate in a closed state to couple capacitor 36A to voltage rail 12 and to reference node 14 in response to voltage estimation unit 32A determining that the voltage between voltage rail 12 and reference node 14 does not exceed the voltage threshold. As previously noted, hysteresis may be used, for instance, by using a first voltage threshold (e.g., ~70%) to couple capacitor 36A to voltage rail 12 and to reference node 14 and a second voltage threshold (e.g., ~80%) to decouple capacitor 36A from voltage rail 12 and to reference node 14.

In instances where multiple capacitor modules 20 are used, capacitor modules 20 may increases a capacitance between voltage rail 12 and the reference node 14 at different estimated voltages such that capacitors 36 are "stepped in." For example, capacitor module 20A may couple capacitor 36A if voltage estimation unit 32A estimates the voltage between voltage rail 12 and reference node 14 to be ~100 V. Then, capacitor module 20B may couple capacitor 36B if voltage estimation unit 32B estimates the voltage between voltage rail 12 and reference node 14 to be ~90 V. Further, capacitor module 20C may couple capacitor 36B if voltage estimation unit 32B estimates the voltage between voltage rail 12 and reference node 14 to be ~80 V, and so on. In this manner, capacitor modules 20 may form multiple parallel branches that may be used to shape a voltage ripple in a designed way and/to reduce an apparent equivalent series resistance and FET $R_{ds(on)}$.

In some examples, capacitors 36A-36N (collectively, "capacitors 36") may be different structural elements. For example, capacitors 36 may have different capacitances. For instance, capacitor 36A may have a higher capacitance (e.g., ~22 μF) than capacitor 36B (e.g., ~15 μF), capacitor 36B may have a higher capacitance than capacitor 36C (e.g., ~10 μF), and so on. In some examples, capacitors 36 may have different voltage ratings. For instance, capacitor 36A may have a higher voltage rating (e.g., ~160 volts) than capacitor 36B (e.g., ~100 volts), capacitor 36B may have a higher voltage rating than capacitor 36C (e.g., ~63 volts), and so on. In this manner, capacitors 36 may be selected to minimize a resulting volume of capacitor switching system 1. For instance, various capacitive density dielectrics may be used, for instance, aluminum, ceramic, or other types of dielectrics. In some instances, one or more techniques described may permit a selection of lower density dielectrics, such as, a ceramic capacitor.

Figure 2:
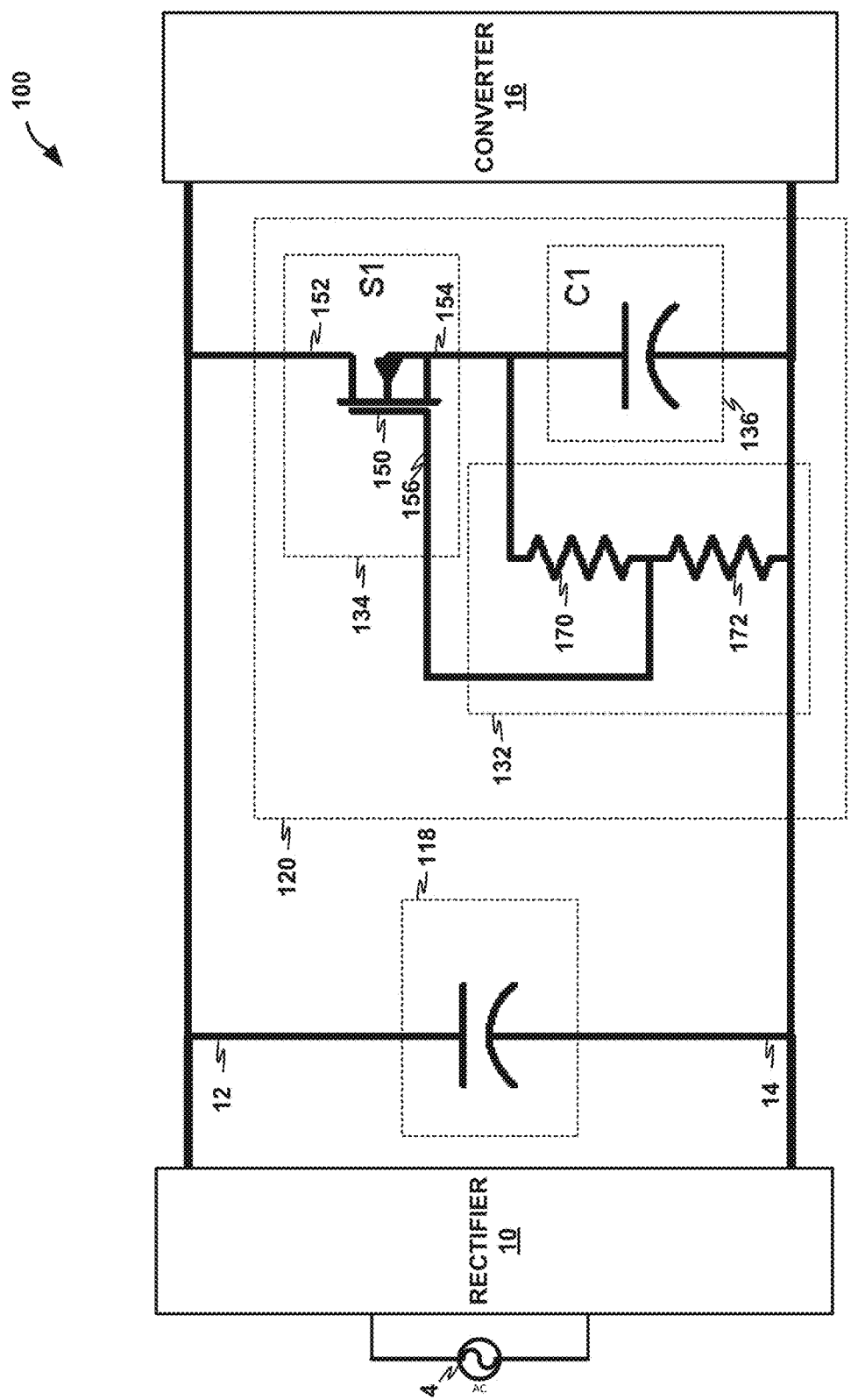
FIG. 2 is a circuit diagram illustrating an example first voltage estimation unit, in accordance with one or more techniques of this disclosure.

FIG. 2 is a circuit diagram illustrating an example first voltage estimation unit 132, in accordance with one or more techniques of this disclosure. FIG. 2 is described below within the context of capacitor switching system 1 of FIG. 1. However, the techniques described below can be used in any permutation, and in any combination, with rectifier 10, voltage rail 12, reference node 14, capacitor 18, capacitor modules 20, and converter 16 to reduce the voltage ripple of a DC voltage. As illustrated in the example of FIG. 2, capacitor switching system 100 may include capacitor 118 and capacitor module 120. Capacitor module 120 may include voltage estimation unit 132, switching unit 134, and capacitor 136.

Capacitor 118 may comprise any suitable electrical component configured to store electrical energy in an electric field. For instance, capacitor 118 may be an aluminum electrolytic capacitor having a voltage rating of 400 volts and a capacitance of 2.2 μF. Although capacitor 118 may be illustrated as a single capacitor, capacitor 118 may be an array of capacitive elements. As shown, capacitor 118 has a first node (e.g., a positive polarity) coupled to voltage rail 12 and a second node (e.g., a negative polarity) coupled to reference node 14. In some examples, capacitor 118 may be omitted.

Switching unit 134 may include a voltage controlled circuit element 150. Although a MOSFET symbol is shown in FIG. 2 as voltage controlled circuit element 150, any electrical device that is controlled by a voltage may be used in place of the MOSFET as described in FIG. 2. Additionally, although voltage controlled circuit element 150 may be illustrated as a high side switch, in some examples, voltage controlled circuit element 150 may be a low side switch. As shown, voltage controlled circuit element 150 may include first node 152 (e.g., a drain) coupled to voltage rail 12, second node 154 (e.g., a source), and control node 156 (e.g., a gate). It should be understood that a depletion FET may be used as voltage controlled circuit element 150. Additionally, although examples may illustrate switching unit 134 using a voltage-controlled element, in some examples, switching unit 134 may use a current-controlled element. Examples of current-controlled elements may include, but are not limited to, gallium nitride (GaN) MOSFETs, BJTs, or other current-controlled elements.

Capacitor 136 may be any suitable electrical component configured to store electrical energy in an electric field. For instance, capacitor 136 may be an aluminum electrolytic capacitor having a voltage rating of ~100 volts and a capacitance of ~22 μF. Although capacitor 136 may be illustrated as a single capacitor, capacitor 136 may be an array of capacitive elements. As shown, capacitor 136 includes first node (e.g., positive polarity) coupled to second node 154 of voltage controlled circuit element 150 and a second node (e.g., a negative polarity) coupled to reference node 14.

Voltage estimation unit 132 may include first resistive element 170 and second resistive element 172 configured as a voltage divider to selectively operate switching unit 134 in an open state or a closed state. As shown, first resistive element 170 may include a first node coupled to second node 154 of voltage controlled circuit element 150 and the first node (e.g., positive polarity) of capacitor 136. Second resistive element 172 may include a first node coupled to a second node of first resistive element 170 and a second node coupled to reference node 14. As shown, control node 156 of voltage controlled circuit element 150 may be coupled to an output of the voltage divider, for instance, the second node of first resistive element 170 and the first node of second resistive element 172.

In some examples, a ratio of resistance between first resistive element 170 and second resistive element 172 may be selected (e.g., formed by a manufacturer, programmed by a customer, or another method) to operate switching unit 134 in a closed and open state based on a voltage of capacitor 136. For instance, the ratio may be selected such that if a voltage of capacitor 136 exceeds a threshold voltage (e.g., ~80% of a voltage rating of capacitor 136), the voltage provided by output by first resistive element 170 and second resistive element 172 into control node 156 may cause voltage controlled circuit element 150 of switching unit 134 to operate in an open state. That is, in the open state, voltage controlled circuit element 150 may decouple capacitor 136 from voltage rail 12. On the other hand, the ratio may be also be selected such that if a voltage of capacitor 136 is within a threshold voltage (e.g., ~80% of the voltage rating of capacitor 136), the voltage provided by output by first resistive element 170 and second resistive element 172 into control node 156 may cause voltage controlled circuit element 150 of switching unit 134 to operate in a closed state. That is, in the closed state, voltage controlled circuit element 150 may couple capacitor 136 in parallel with capacitor 118, thereby increasing a capacitance between voltage rail 12 and the reference node 14. In this manner, switching unit 134 may prevent capacitor 136 from having a voltage exceeding the threshold voltage (e.g., a voltage rating of capacitor 136) while permitting the capacitor 136 to add capacitance between voltage rail 12 and reference node 14 when capacitor 136 has a voltage below the threshold voltage.

Figure 3A:
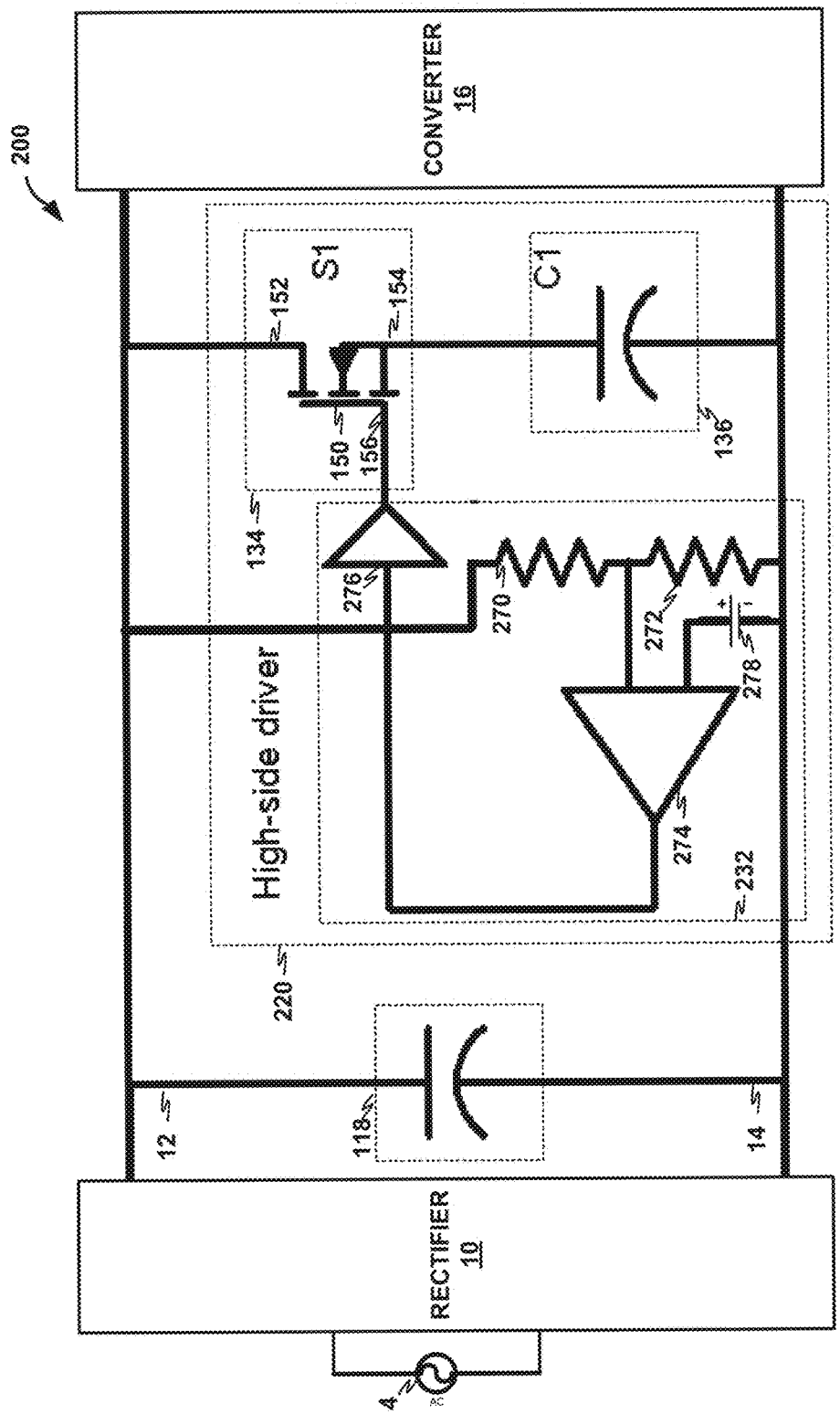
FIG. 3A is a circuit diagram illustrating an example second voltage estimation unit, in accordance with one or more techniques of this disclosure.

FIG. 3A is a circuit diagram illustrating an example second voltage estimation unit 232, in accordance with one or more techniques of this disclosure. FIG. 3A is described below within the context of capacitor switching system 1 of FIG. 1. However, the techniques described below can be used in any permutation, and in any combination, with voltage rail 12, reference node 14, rectifier 10, capacitor 18, capacitor modules 20, and converter 16 to reduce the voltage ripple of a DC voltage. As illustrated in the example of FIG. 3A, capacitor switching system 200 includes capacitor 118, capacitor 136, and switching unit 134 as described in FIG. 2. As shown, capacitor switching system 200 may include capacitor module 220, which may include voltage estimation unit 232. Voltage estimation unit 232 may include first resistive element 270, second resistive element 272, comparator 274, driver 276, and voltage source 278. Voltage source 278 may be any suitable voltage device configured to output a reference voltage.

In some instances, it may be desirable to operate voltage controlled circuit element 150 of switching unit 134 outside of a linear region such that losses incurred in voltage controlled circuit element 150 may be reduced. That is, it may be desirable to operate voltage controlled circuit element 150 as either in a fully closed state (e.g., short circuit) or in a fully open state (e.g., open circuit) to reduce power losses in voltage controlled circuit element 150. So, voltage estimation unit 232 may include comparator 274 to ensure that voltage controlled circuit element 150 is operated outside a linear operating region of voltage controlled circuit element 150.

Comparator 274 may compare two voltages and output a digital signal (e.g., ~5 volts or ~0 volts) indicating which is larger. As shown, comparator 274 may compare a reference voltage generated by voltage source 278 with a voltage output of a voltage divider formed by first resistive element 270 and second resistive element 272 and output a digital signal indicating which is larger. More specifically, first resistive element 270 may include a first node coupled to voltage rail 12 and a second node. In some examples, the first node of first resistive element 270 may be coupled to the first node of capacitor 136. Second resistive element 272 may include a first node coupled to the second node of first resistive element 270 and a second node coupled to reference node 14. The second node of first resistive element 270 and the first node of second resistive element 272 may be coupled to the input of comparator 274. In this manner, comparator 274 may prevent voltage controlled circuit element 150 from operating inside a linear operating region by only outputting a digital signal (e.g., ~5 volts or ~0 volts).

Switching unit 134 may selectively couple capacitor 136 to voltage rail 12 and reference node 14 based on a signal generated on the output of comparator 274. In some examples, an output of comparator 274 may be directly coupled to control node 156 of voltage controlled circuit element 150. As shown, an output of comparator 274 may be coupled to an input of driver 276, which has an output coupled to control node 156 of voltage controlled circuit element 150. Driver 276 may be any suitable device that accepts an input and produces an output capable to drive switching unit 134 to operate in either an open state or a closed state. For instance, driver 276 may be an isolated (or floating/level-shifted) gate-driver.

Figure 3B:
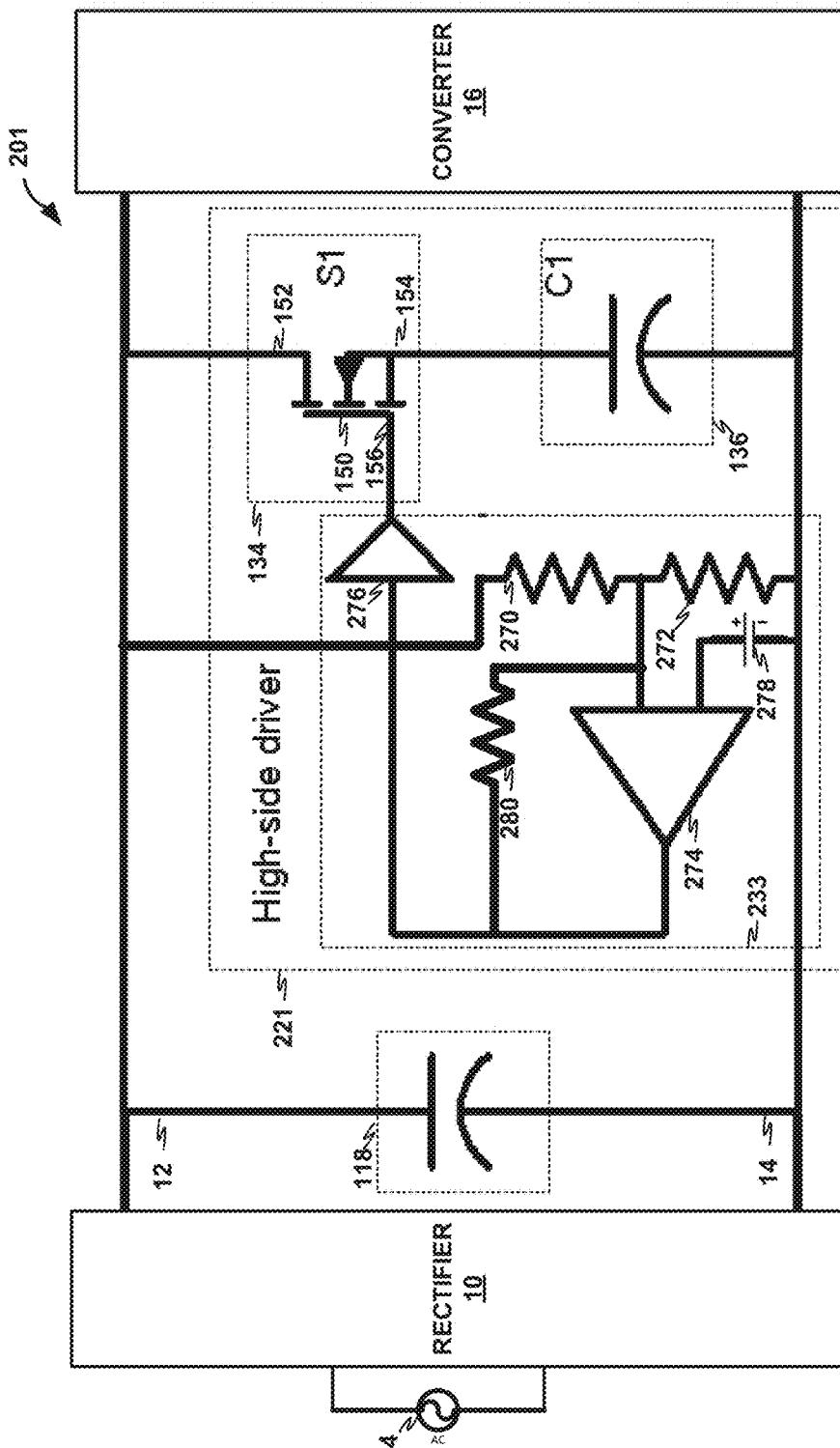
FIG. 3B is a circuit diagram illustrating an example third voltage estimation unit, in accordance with one or more techniques of this disclosure.

FIG. 3B is a circuit diagram illustrating an example third voltage estimation unit 233, in accordance with one or more techniques of this disclosure. FIG. 3B is described below within the context of capacitor switching system 1 of FIG. 1. However, the techniques described below can be used in any permutation, and in any combination, with voltage rail 12, reference node 14, rectifier 10, capacitor 18, capacitor modules 20, and converter 16 to reduce the voltage ripple of a DC voltage. As illustrated in the example of FIG. 3B, capacitor switching system 201 includes capacitor 118, capacitor 136, and switching unit 134 as described in FIG. 2. As shown, capacitor switching system 201 may include capacitor module 221, which may include voltage estimation unit 233. Voltage estimation unit 233, similarly to voltage estimation unit 232 of FIG. 3A, may include first resistive element 270, second resistive element 272, comparator 274, driver 276, voltage source 278. As shown, voltage estimation unit 233 may further include resistive element 280. Resistive element 280 may provide hysteresis control, by coupling a first node of resistive element 280 to the output of comparator 274 and coupling a second node of resistive element 280 to the output of the voltage divider formed by first resistive element 270 and second resistive element 272.

Figure 4A:
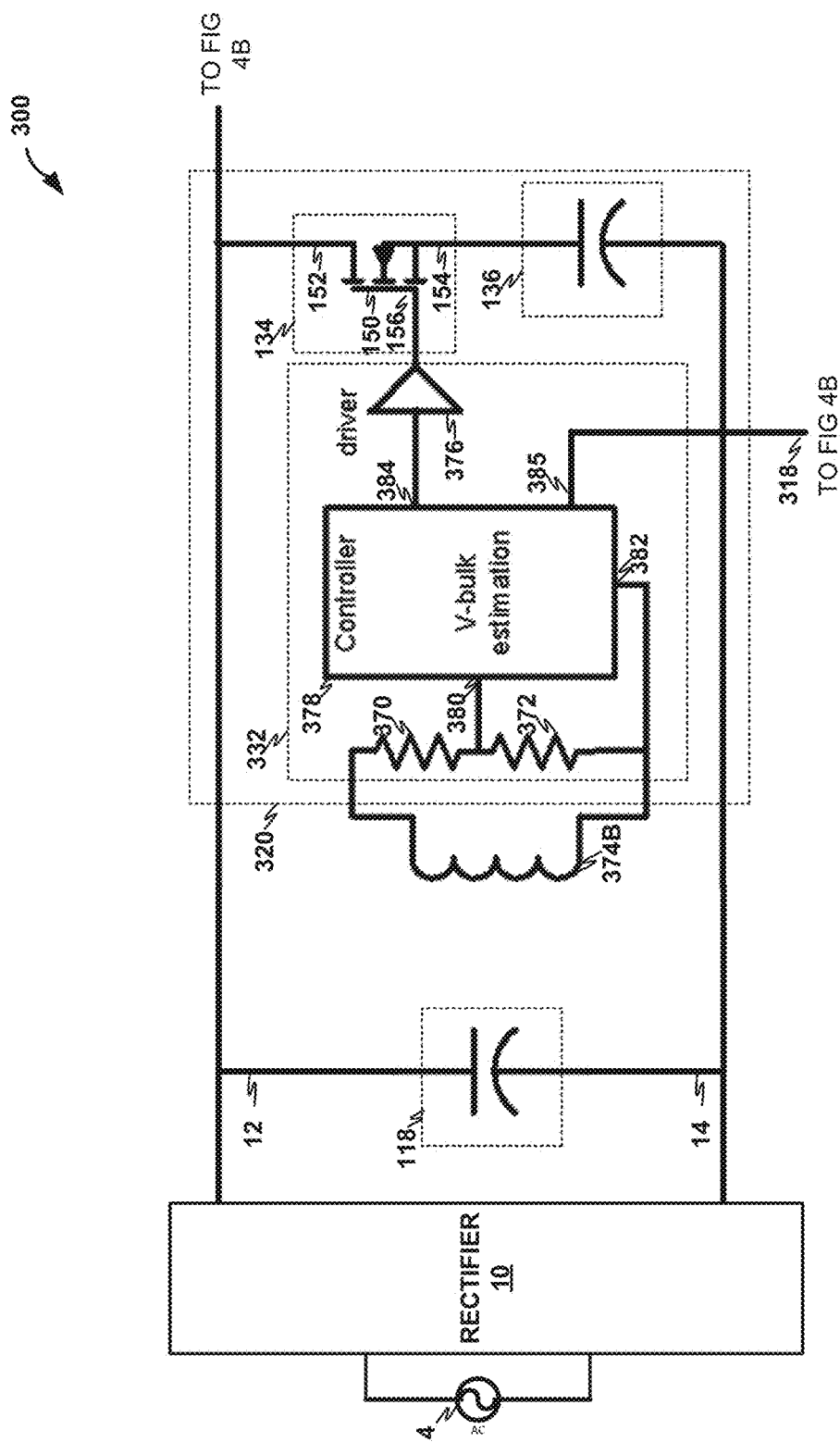
FIGS. 4A and 4B are circuit diagrams illustrating an example fourth voltage estimation unit and an example converter, in accordance with one or more techniques of this disclosure.
Figure 4B:
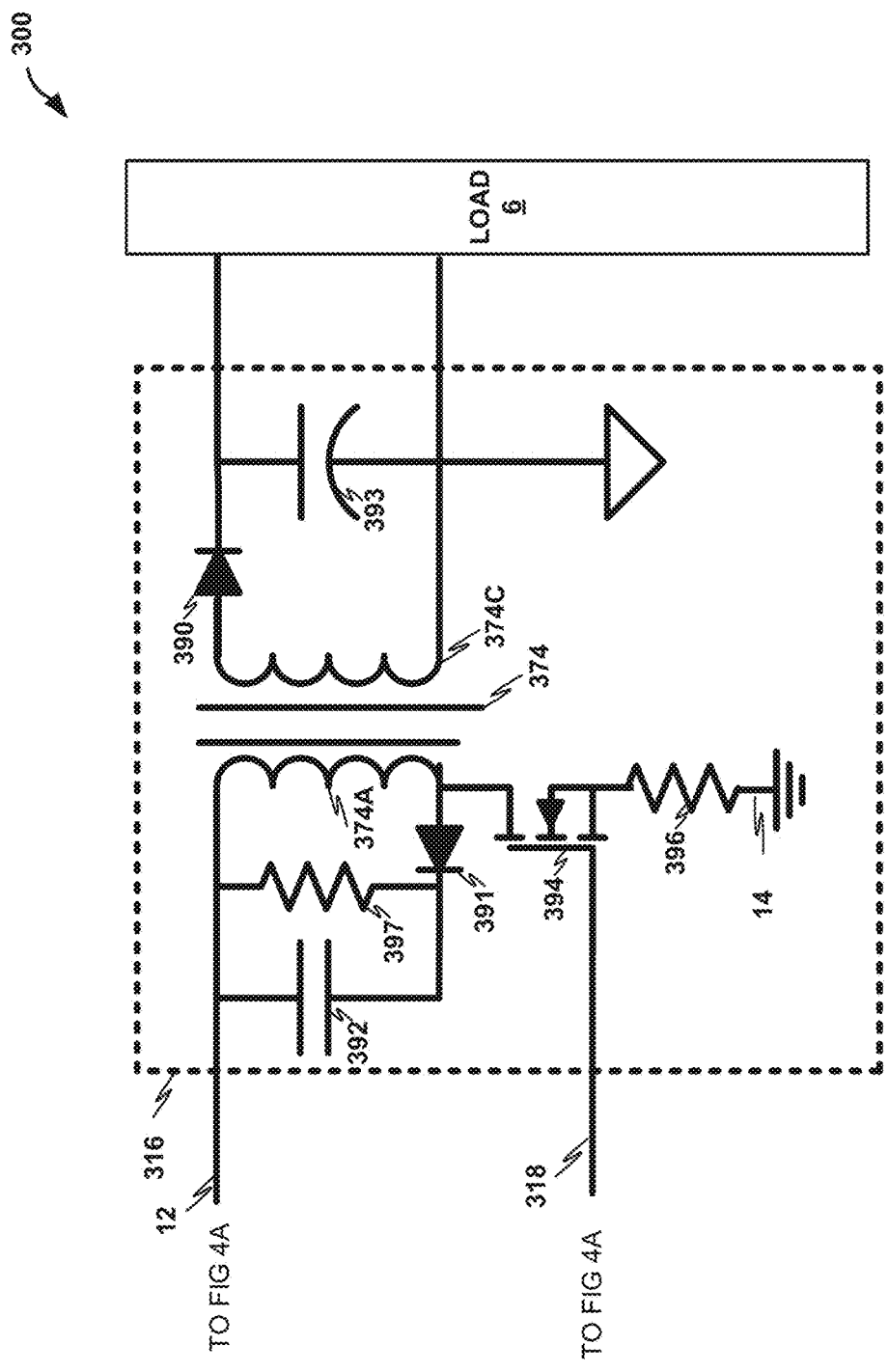

FIGS. 4A and 4B are circuit diagrams illustrating an example fourth voltage estimation unit 332 and an example converter 316, in accordance with one or more techniques of this disclosure. FIGS. 4A and 4B are described below within the context of capacitor switching system 1 of FIG. 1. However, the techniques described below can be used in any permutation, and in any combination, with AC voltage source 4, rectifier 10, capacitor 18, capacitor modules 20, converter 16, and load 6 to reduce the voltage ripple of a DC voltage. As illustrated in the example of FIGS. 4A and 4B, capacitor switching system 300 includes capacitor 118, capacitor 136, and switching unit 134 as described in FIG. 2. As shown, capacitor module 320 may include voltage estimation unit 332, which may include first resistive element 370, second resistive element 372, driver 376, and controller 378. As shown, converter 316 may be a flyback converter having a first transformer winding 374A, second transformer winding 374B, and third transformer winding 374C ("collectively, "transformer 374"). Converter 316 may include diodes 390 and 391, capacitors 392 and 393, voltage controlled circuit element 394, and resistive elements 396 and 397. As shown, voltage controlled circuit element 394 of converter 316 is controlled by controller 378 of voltage estimation unit 332 via link 318. Additionally, although examples may illustrate converter 316 using a voltage-controlled element, in some examples, converter 316 may use a current-controlled element.

Controller 378 may be configured to control switching unit 134 to reduce a voltage ripple between voltage rail 12 and reference node 14. In some examples, controller 378 may be a switched-mode power supply (SMPS) controller configured to control a switched-mode power converter, for instance, a flyback controller. In some examples, controller 378 may include an analog circuit. In some examples, controller 378 may be a microcontroller on a single integrated circuit containing a processor core, memory, inputs, and outputs. For example, controller 378 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, controller 378 may be a combination of one or more analog components and one or more digital components. As shown, controller 378 may include first input 380 coupled to a second node of first resistive element 370 and to a first node of second resistive element 372, second input 382 coupled to a second node of second resistive element 372, a first output 384, and a second output 385 coupled, via link 318, to voltage controlled circuit element 394.

Transformer 374 may indirectly measure a voltage of capacitor 118. As shown, transformer 374 includes winding 374A including a first node coupled to voltage rail 12 and a second node coupled to a first node of voltage controlled circuit element 394, winding 374B including a first node coupled to a first node of first resistive element 370 and a second node coupled to second input 382 of controller 378, and winding 374C having a first node coupled to, via diode 390, a first node of load 6 and a second node coupled to a second node of load 6.

Switching unit 134 may selectively couple capacitor 136 to voltage rail 12 and reference node 14 based on a signal generated on output 384 of controller 378. In some examples, output 384 of controller 378 may be directly coupled to control node 156 of voltage controlled circuit element 150. As shown, output 384 of controller 378 may be coupled to an input of driver 376, which has an output coupled to control node 156 of voltage controlled circuit element 150. Driver 376 may be substantially similar to driver 276 of FIG. 3. For instance, driver 376 may be an isolated (or floating/level-shifted) gate-driver.

In some examples, controller 378 may pre-charge capacitor 136 and capacitor 118 to reduce an inrush current. For example, controller 378 may determine whether capacitor 118 is fully charged. In response to determining that capacitor 118 is fully charged, controller 378 may initiate a pre-charging of capacitor 136. In some examples, controller 378 may pre-charge capacitor 136 using pulse width modulation. In this manner, an inrush current of capacitor switching system 300 may be reduced.

Figure 5:
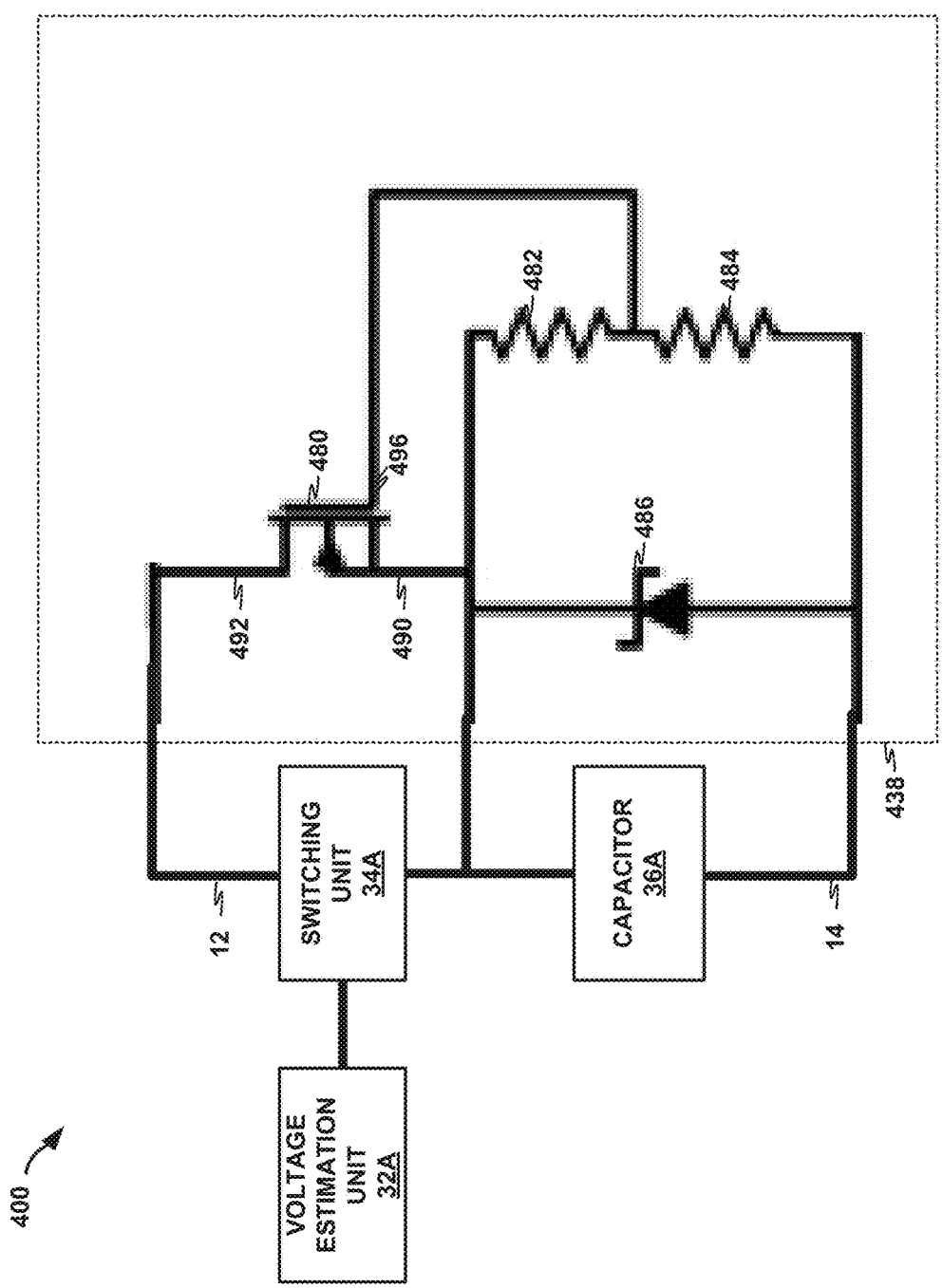
FIG. 5 is a circuit diagram illustrating an example startup unit and an example overvoltage element, in accordance with one or more techniques of this disclosure.

FIG. 5 is a circuit diagram illustrating an example startup unit 438 and an example overvoltage element 486, in accordance with one or more techniques of this disclosure. FIG. 5 is described below within the context of capacitor module 20A of FIG. 1. However, the techniques described below can be used in any permutation, and in any combination, with AC voltage source 4, rectifier 10, capacitor 18, capacitor modules 20, converter 16, and load 6 to reduce the voltage ripple of a DC voltage. In the example of FIG. 5, capacitor switching system 400 includes voltage rail 12, reference node 14, voltage estimation unit 32A, switching unit 34A, and capacitor 36A as described in FIG. 1. As shown, capacitor switching system 400 may include startup unit 438. Although startup unit 438 is described as being implemented in capacitor module 20A, startup unit 438 may be implemented in any number of capacitor modules 20. For instance, startup unit 438 may be used in capacitor module 20A, 20B, 20C, and so on. Additionally, although startup unit 438 may be implemented in each of capacitor modules 20, startup unit 438 may be implemented in one (e.g., capacitor module 20A) of capacitor modules 20 and configured to startup all of capacitor modules 20.

Startup unit 438 may include voltage controlled circuit element 480, first resistive element 482, second resistive element 484, and overvoltage element 486. Startup unit 438 may be configured to couple capacitor 36A to charge capacitor 36A during a startup operation of capacitor switching system 400. Examples of a startup operation may include instances where a comparator (e.g., comparator 274 of FIG. 3), a controller (e.g., controller 378 of FIG. 4A), or other components do not have power to be operation. In this manner, voltage controlled circuit element 480 may prevent capacitor 36A from having a voltage exceeding the threshold voltage (e.g., 80% of a voltage rating of capacitor 36A) while permitting the capacitor 36A to, immediately upon receiving input power, begin charging during a startup operational. Additionally, although examples may illustrate startup unit 438 using a voltage-controlled element, in some examples, startup unit 438 may use a current-controlled element.

Although a MOSFET symbol is shown in FIG. 5 as voltage controlled circuit element 480, any electrical device that is controlled by a voltage may be used in place of the MOSFET as described in FIG. 5. Additionally, although voltage controlled circuit element 480 may be illustrated as a high side switch, in some examples, voltage controlled circuit element 480 may be a low side switch. As shown, voltage controlled circuit element 480 may include first node 492 (e.g., a drain) coupled to voltage rail 12, second node 490 (e.g., a source) coupled to a first node (e.g., positive polarity) of capacitor 36A, and control node 496 (e.g., a gate). It should be understood that a depletion FET may be used as voltage controlled circuit element 480.

First resistive element 482 and second resistive element 484 may form a voltage divider that drives voltage controlled circuit element 480 during a startup operation. As shown, first resistive element 482 may include a first node coupled to second node 490 of voltage controlled circuit element 480 and a second node coupled to control node 496 of voltage controlled circuit element 480. Second resistive element 484 may include a first node coupled to control node 496 of voltage controlled circuit element 480 and a second node coupled to reference node 14. More specifically, a ratio of resistance between first resistive element 482 and second resistive element 484 may be selected to operate voltage controlled circuit element 480 in a closed state or an open state based on a voltage of capacitor 36A. For instance, voltage controlled circuit element 480 may operate in a closed state if the output of first resistive element 482 and second resistive element 484 is below a turn-on threshold of voltage controlled circuit element 480 and voltage controlled circuit element 480 may operate in an open state if the output of first resistive element 482 and second resistive element 484 is above the turn-on threshold of voltage controlled circuit element 480.

Overvoltage element 486 may be configured to prevent unsafe failure due to an overvoltage of capacitor 36A. Examples of overvoltage element 486 may include, but are not limited to, metal oxide varistors (MOVs), transient-voltage-suppression diodes, avalanche diodes, clamping devices, Zener diodes, transient voltage suppressors, Schottky diodes, any other types of voltage suppressors, or any combination of the same. As shown, overvoltage element 486 may have an anode coupled to reference node 14 and a cathode coupled to a first node (e.g., positive polarity) of capacitor 36A.

Figure 6:
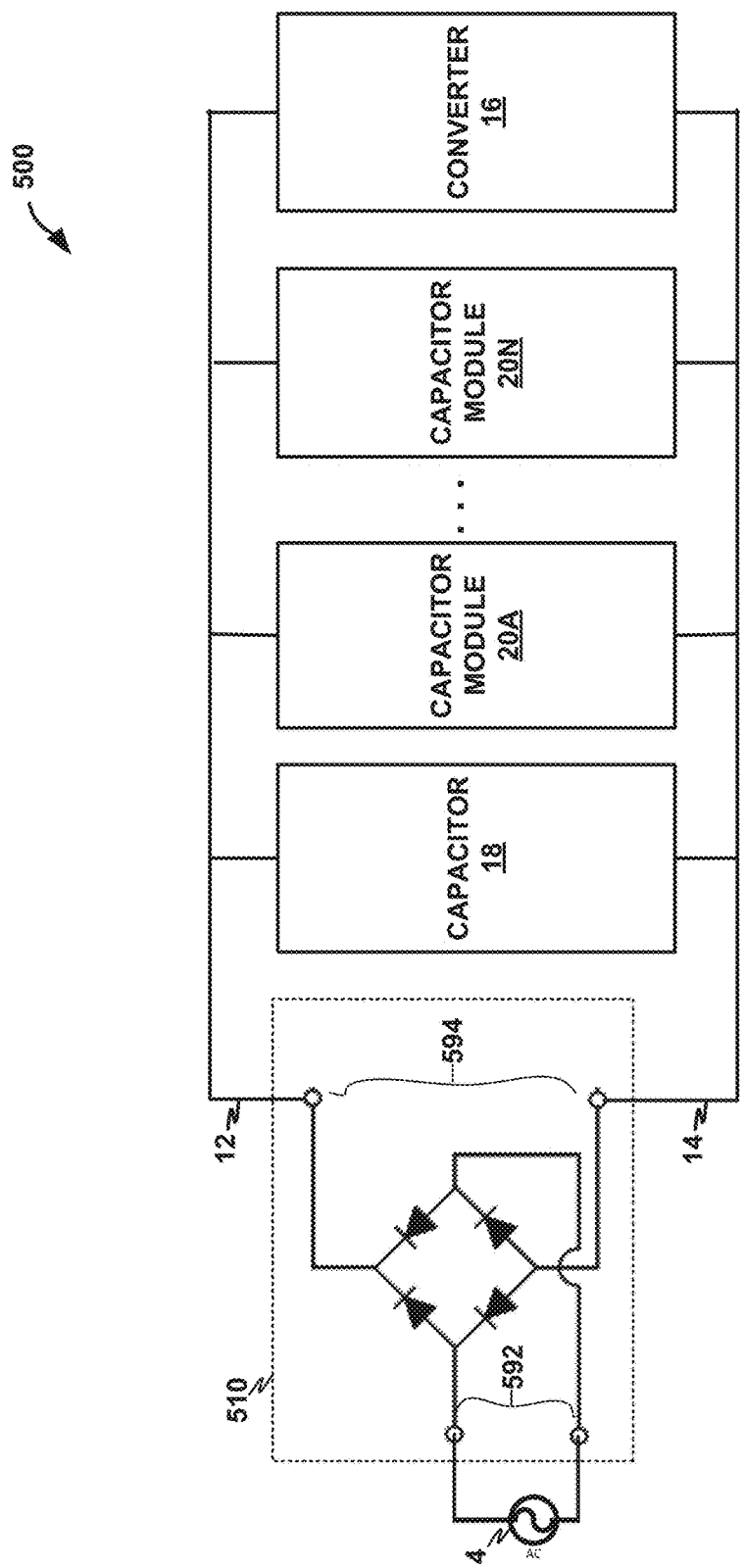
FIG. 6 is a circuit diagram illustrating an example rectifier, in accordance with one or more techniques of this disclosure.

FIG. 6 is a circuit diagram illustrating an example rectifier 510, in accordance with one or more techniques of this disclosure. FIG. 6 is described below within the context of capacitor switching system 1 of FIG. 1. However, the techniques described below can be used in any permutation, and in any combination, with AC voltage source 4, rectifier 10, capacitor 18, capacitor modules 20, converter 16, and load 6 to reduce the voltage ripple of a DC voltage.

Rectifier 510 may be configured to receive an AC voltage at input 592 and output a substantially DC (e.g., rectified) voltage at output 594. For instance, input 592 may receive ~120 $V_{AC}$ at ~60 Hz $V_{AC}$ from AC voltage source 4 and output 594 may provide, along with capacitor 18 and capacitor modules 20 of FIG. 1, a substantially DC voltage having a small AC voltage ripple having the ~120 Hz oscillation received at input 592.

Figure 7:
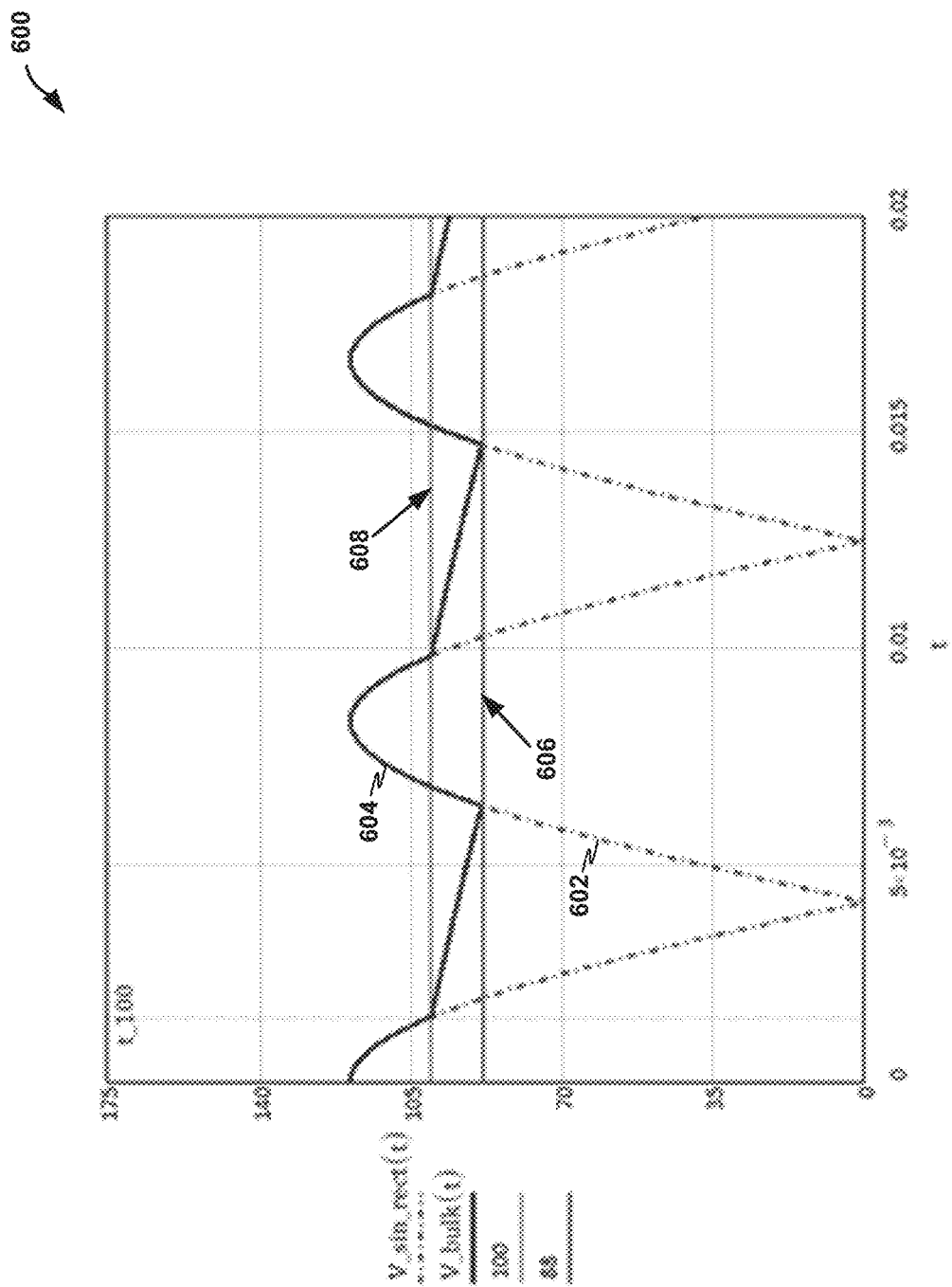
FIG. 7 is a diagram illustrating exemplary voltage ripples, in accordance with one or more techniques of this disclosure.

FIG. 7 is a diagram illustrating exemplary voltage ripples 600, in accordance with one or more techniques of this disclosure. FIG. 7 is described below within the context of capacitor switching system 1 of FIG. 1. However, the techniques described below can be used in any permutation, and in any combination, with AC voltage source 4, rectifier 10, capacitor 18, capacitor modules 20, converter 16, and load 6 to reduce the voltage ripple of a DC voltage.

As shown, rectified signal 602, for instance, output by rectifier 510 of FIG. 6, may having a ripple that spans 0 volts to 120 volts. Rectified signal 602 may represent an example of capacitor switching system 1 in instances where capacitor 18 may have a very small or no capacitance and capacitors 36A-N are decoupled from voltage rail 12 and reference node 14.

Once rectified signal 602 is below voltage threshold 608, one or more capacitor modules 20 may operate in a closed state to couple capacitors 36A-N between voltage rail 12 and reference node 14, thereby increasing a capacitance. As such, capacitors 36A-N may reduce the voltage ripple to span between minimum voltage 606 (e.g., ~88 volts) and a maximum voltage of rectified signal 602 (e.g., ~120 volts), thereby resulting in low ripple signal 604.

Figure 8:
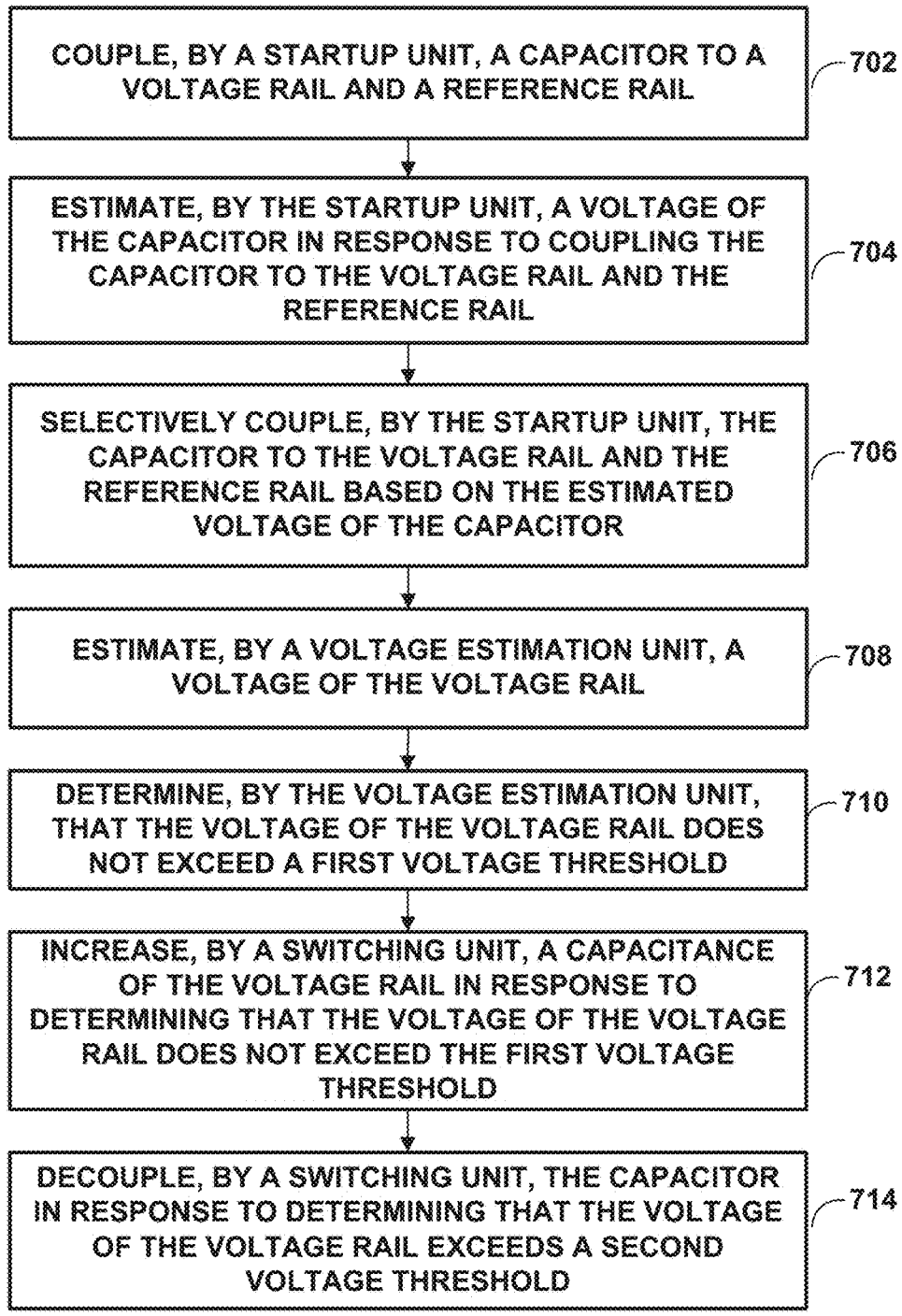
FIG. 8 is a flow diagram consistent with techniques that may be performed by a circuit in accordance with this disclosure.

FIG. 8 is a flow diagram consistent with techniques that may be performed by a circuit in accordance with this disclosure. For purposes of illustration only, the example operations are described below within the context of capacitor switching system 1, as shown in FIG. 1. However, the techniques described below can be used in any permutation, and in any combination, with AC voltage source 4, rectifier 10, capacitor 18, capacitor modules 20, converter 16, and load 6 to reduce the voltage ripple of a DC voltage. Although the following describes capacitor module 20A, it should be understood that the description of capacitor module 20A may apply to each of capacitor modules 20. Further, in some examples, capacitor switching system 1 may include only one of capacitor modules 20, for instance, capacitor module 20A, while in other instances capacitor switching system 1 may include multiple capacitor modules 20, for instance, capacitor modules 20A-20B, capacitor modules 20A-20C, capacitor modules 20A-20N, or other combinations of capacitor modules 20.

In accordance with one or more techniques of this disclosure, startup unit 38A may couple capacitor 36A to voltage rail 12 and reference node 14 (702). For instance, voltage controlled circuit element 480 (e.g., a depletion mode MOSFET) of FIG. 5 may initially operate in a closed state. Then, startup unit 38A may estimate a voltage of capacitor 36A in response to coupling capacitor 36A to voltage rail 12 and reference node 14 (704). For instance, first resistive element 482 and second resistive element 484 of FIG. 5 may form a voltage divider that outputs a voltage. Next, startup unit 38A selectively couples capacitor 36A to voltage rail 12 and reference node 14 based on the estimated voltage of capacitor 36A (706). For instance, the voltage divider formed by first resistive element 482 and second resistive element 484 of FIG. 5 may divide the voltage of capacitor 36A such that voltage controlled circuit element 480 of FIG. 5 operates in an open state when a voltage of capacitor 36A exceeds 80% of a voltage rating of capacitor 36A.

After startup unit 38A selectively couples capacitor 36A, voltage estimation unit 32A may estimate a voltage between voltage rail 12 and reference node 14 (708). For instance, voltage estimation unit 32A may estimate the voltage between voltage rail 12 and reference node 14 by directly detecting a voltage of capacitor 36A as shown in FIGS. 2 and 3. In some instances, voltage estimation unit 32A may estimate the voltage between voltage rail 12 and reference node 14 by indirectly detecting a voltage of capacitor 18. For instance, transformer 374 of FIGS. 4A and 4B may receive the voltage of capacitor 118 and output a voltage that is proportional to the voltage between voltage rail 12 and reference node 14. In some instances, voltage estimation unit 32A may estimate the voltage between voltage rail 12 and reference node 14 by directly or indirectly detecting a voltage output by AC voltage source 4 and/or rectifier 10.

Once voltage estimation unit 32A estimates the voltage between voltage rail 12 and reference node 14, voltage estimation unit 32A may determine that the voltage between voltage rail 12 and reference node 14 does not exceeds a first voltage threshold (710). For example, voltage estimation unit 32A may determine that the voltage between voltage rail 12 and reference node 14 does not exceed the first voltage threshold if the estimated voltage is less than 80% of a voltage rating of capacitor 36A. More specifically, a ratio of first resistive element 170 and second resistive element 172 of FIG. 2 may output a voltage corresponding to a logical '1' if the estimated voltage is greater than 80% of a voltage rating of capacitor 36A. In some example, comparator 274 of FIG. 3 may output a voltage corresponding to a logical '1' if the estimated voltage is greater than 80% of a voltage rating of capacitor 36A. In some example, controller 378 of FIG. 4A may output, at output 384, a voltage corresponding to a logical '1' if the estimated voltage is greater than 80% of a voltage rating of capacitor 36A.

In response to voltage estimation unit 32A determining that the voltage between voltage rail 12 and reference node 14 does not exceed the first voltage threshold, switching unit 34A, may increase a capacitance between voltage rail 12 and reference node 14 (712). For instance, switching unit 34A may operate in a closed state to couple capacitor 36A to voltage rail 12 and to reference node 14.

Once switching unit 34A increases the capacitance between voltage rail 12 and reference node 14, switching unit 34A, may decouple a capacitance between voltage rail 12 and reference node 14 (714) in response to determining that the voltage of voltage rail 12 and reference node 14 exceeds a second voltage threshold. For instance, in response to voltage estimation unit 32A determining that an estimated voltage is greater than 90% of a voltage rating of capacitor 36A, switching unit 34A may operate in an open state to decouple capacitor 36A from voltage rail 12 and reference node 14.

Figure 9A:
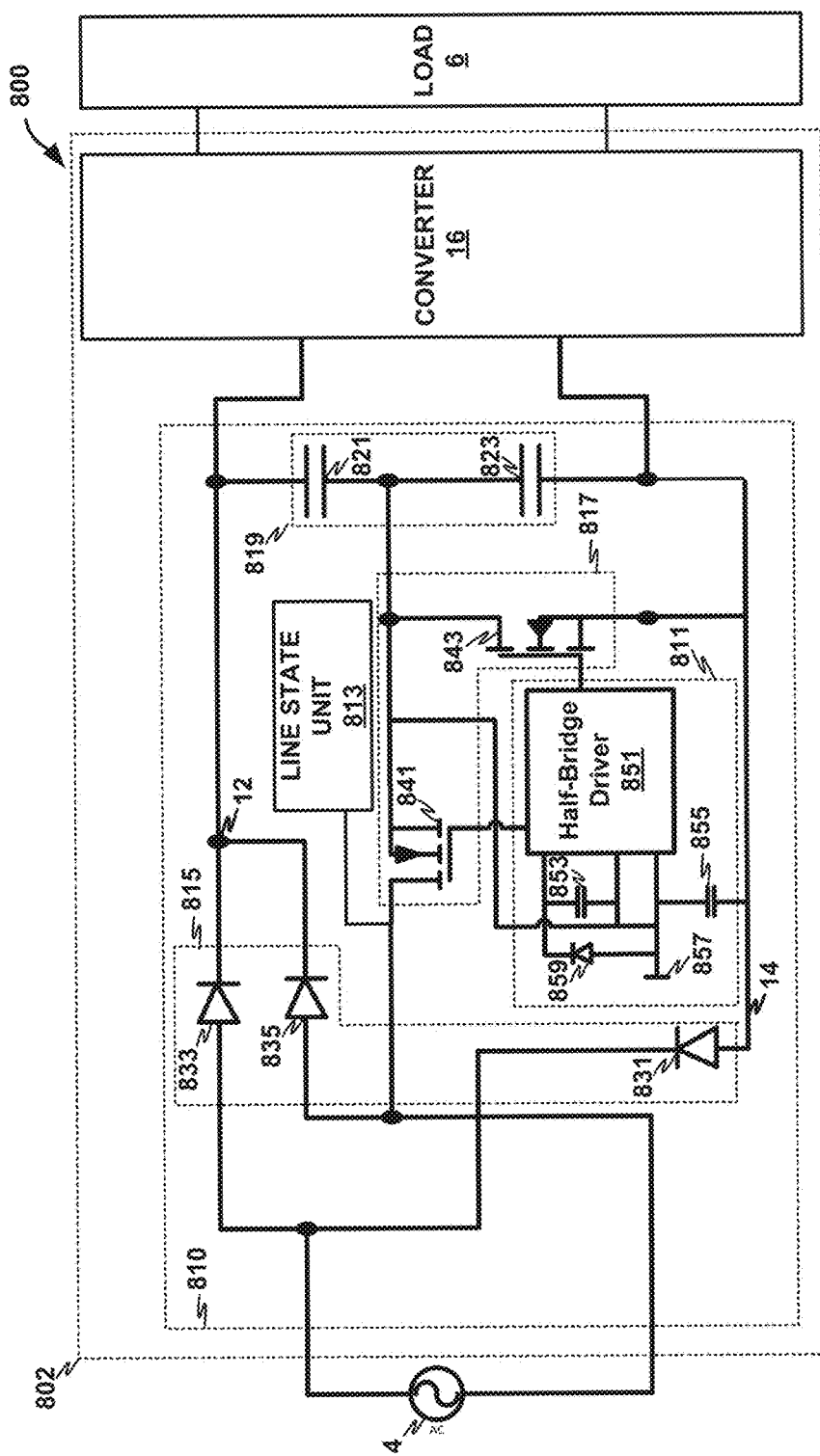
FIG. 9A is a circuit diagram illustrating an example first voltage doubler rectifier, in accordance with one or more techniques of this disclosure.

FIG. 9A is a circuit diagram illustrating an example first voltage doubler rectifier 810, in accordance with one or more techniques of this disclosure. FIG. 9A is described below within the context of capacitor switching system 1 of FIG. 1. However, the techniques described below can be used in any permutation, and in any combination, with voltage rail 12, reference node 14, capacitor 18, capacitor modules 20, and converter 16 to increase a voltage received by converter 16.

In accordance with one or more techniques described herein, rather than charging a single capacitor using a rectified AC voltage supplied by AC voltage source 4, first voltage doubler rectifier 810 may be configured to separately charge multiple capacitors using the rectified AC voltage supplied by AC voltage source 4. In this manner, first voltage doubler rectifier 810 may output a peak voltage that is greater than a peak voltage supplied by AC voltage source 4. Moreover, since converter 16 may increase in efficiency as a received voltage increases, first voltage doubler rectifier 810 may improve an efficiency of converter 16, which may improve a total efficiency of adapter 802.

As illustrated in the example of FIG. 9A, voltage doubler switching system 800 may include adapter 802 including first voltage doubler rectifier 810 and converter 16. Although referred as a voltage doubler, voltage doubler switching system 800 may refer to any system configured to output a higher peak voltage than received. For instance, voltage doubler switching system 800 may output a ~10%, ~20%, ~40%, ~60%, or another defined percentage higher peak voltage to converter 16 than a peak voltage received by AC voltage source 4. As shown, first voltage doubler rectifier 810 may include driver 811, line state unit 813, rectifier 815, switching unit 817, and series string 819 that includes capacitor 821 and capacitor 823. In some examples, capacitor 821 and/or capacitor 832 may be unipolar or polar (e.g., configured with one positive node and one negative node). In some examples, capacitor 821 and/or capacitor 832 may be bipolar (e.g., configured with two nodes where either node may be the positive node).

Rectifier 815 may be configured to receive an AC voltage from AC voltage source 4 and supply a rectified AC voltage between voltage rail 12 and reference node 14. As shown, rectifier 815 includes diode 831 including an anode coupled to reference node 14 and a cathode coupled to a second node of AC voltage source 4, diode 833 including an anode coupled to the second node of AC voltage source 4 and a cathode coupled to voltage rail 12, and diode 835 including an anode coupled to a first node of AC voltage source 4 and a cathode coupled to voltage rail 12.

Switching unit 817 may be configured to selectively switch capacitor 821 and capacitor 823 such that a peak voltage of series string 819 is greater than a peak voltage of the AC voltage supplied by AC voltage source 4. As shown, switching unit 817 includes voltage controlled circuit element 841 and voltage controlled circuit element 843. Although a MOSFET symbol is shown in FIG. 9A as voltage controlled circuit element 841 and voltage controlled circuit element 843, any electrical device that is controlled by a voltage may be used in place of the MOSFET as described in FIG. 9A. Additionally, although examples may illustrate switching unit 817 using a voltage-controlled element, in some examples, switching unit 817 may use a current-controlled element. As shown, voltage controlled circuit element 841 may include first node (e.g., a drain) coupled to the first node of AC voltage source 4, a second node (e.g., a source) coupled to the second node of capacitor 821, and a control node (e.g., a gate). As shown, voltage controlled circuit element 843 may include first node (e.g., a drain) coupled to the second node of capacitor 821, a second node (e.g., a source) coupled to reference node 14, and a control node (e.g., a gate). It should be understood that a depletion FET may be used as voltage controlled circuit element 841 and/or voltage controlled circuit element 843. In some instances, voltage controlled circuit element 841 may include an intrinsic diode that permits rectifier 815 to omit a diode (e.g., include only diodes 831, 833, and 835). Additionally, voltage controlled circuit element 843 may be switched such that an intrinsic diode is bypassed, thereby improving an efficiency of adapter 802.

In accordance with one or more techniques described herein, voltage doubler switching system 800 may permit voltage controlled circuit element 841 and/or voltage controlled circuit element 843 to use unidirectional blocking rather than bidirectional blocking. For example, voltage controlled circuit element 841 may be configured to permit current to flow from the first node of voltage controlled circuit element 841 to the second node of voltage controlled circuit element 841 when a signal received at the control node of voltage controlled circuit element 841 satisfies a threshold (e.g., turn-on voltage) and configured to prevent current to flow from the first node of voltage controlled circuit element 841 to the second node of voltage controlled circuit element 841 when the signal received at the control node of voltage controlled circuit element 841 does not satisfy the threshold, and voltage controlled circuit element 841 is configured to permit current to flow from the second node of voltage controlled circuit element 841 to the first node of voltage controlled circuit element 841 when the signal received at the control node of voltage controlled circuit element 841 does not satisfy the threshold and when the signal received at the control node of voltage controlled circuit element 841 satisfies the threshold. As such, voltage controlled circuit element 841 and/or voltage controlled circuit element 843 may each be implemented as a single MOSFET with an intrinsic body diode rather than a mechanical relay or two MOSFETs in a back-to-back configuration, thereby reducing a complexity, cost, size, and/or resistive loss of voltage doubler switching system 800. Moreover, as described further below, implementing voltage controlled circuit element 841 and/or voltage controlled circuit element 843 as unidirectional blocking may permit use of a half-bridge driver to control switching, thereby further reducing a cost and complexity of voltage doubler switching system 800.

Driver 811 may be configured to operate voltage controlled circuit element 841 in an open state and operate voltage controlled circuit element 843 in a closed state during a first state (e.g., high-line) of voltage doubler switching system 800 and operate voltage controlled circuit element 841 in a closed state and operate voltage controlled circuit element 843 in an open state during a second state (e.g., low-line) of voltage doubler switching system 800. For instance, driver 811 may operate in one of a first state that generates a logical '0' gate signal for voltage controlled circuit element 841 and a logical '1' gate signal for voltage controlled circuit element 843 or a second state that generates a logical '1' gate signal for voltage controlled circuit element 841 and a logical '0' gate signal for voltage controlled circuit element 843. As shown, driver 811 may include half-bridge driver 851, capacitor 853, capacitor 855, voltage source 857, and diode 859. Voltage source 857 may be any suitable voltage device configured to turn on voltage controlled circuit element 841 and/or voltage controlled circuit element 843. Half-bridge driver 851 may selectively couple capacitor 855 to a control node of voltage controlled circuit element 843 to switch voltage controlled circuit element 843 and selectively couple capacitor 853 to a control node of voltage controlled circuit element 841 to switch voltage controlled circuit element 841. It should be understood that, in some examples, driver 811 may be controlled using one or more voltage estimation units 32. For instance, voltage estimation unit 32A may be used to determine whether a line level of the AC voltage, AC rectified voltage, or another voltage corresponds with a first state (e.g., high-line) or a second state (e.g., low-line) while omitting switching unit 34A, capacitor 36A, and startup unit 38A.

Line state unit 813 may be configured to control driver 811 to operate voltage doubler switching system 800 in a first state (e.g., high-line) or a second state (e.g., low-line). In some examples, line state unit 813 may include an analog circuit. In some examples, line state unit 813 may be a microcontroller on a single integrated circuit containing a processor core, memory, inputs, and outputs. In some examples, line state unit 813 may be a combination of one or more analog components and one or more digital components.

In accordance with one or more techniques described herein, rather than charging a single capacitor in parallel with AC voltage source 4 and supplying converter 16 with the voltage across the single capacitor, voltage doubler switching system 800 may charge each capacitor of a set of capacitors with AC voltage source 4 and supply converter 16 with the resulting voltage across a series string of the capacitors. In some examples, during the first state (e.g., high-line) of voltage doubler switching system 800, voltage in a first direction supplied by AC voltage source 4 charges capacitor 821 and voltage in a second direction supplied by AC voltage source 4 charges capacitor 821. In some examples, during the second state (e.g., low-line) of voltage doubler switching system 800, voltage in the first direction supplied by AC voltage source 4 charges capacitor 821 and voltage in the second direction supplied by AC voltage source 4 charges capacitor 823. In this manner, converter 16 may receive, from series string 819, a higher voltage than supplied by AC voltage source 4, which may improve an efficiency of converter 16, thereby resulting in an improved efficiency of adapter 802. Moreover, voltage doubler switching system 800 permits voltage controlled circuit element 843 and capacitor 823 to have a voltage rating that is half of a full input voltage supplied by AC voltage source 4, thereby further reducing a volume of adapter 802.

Figure 9B:
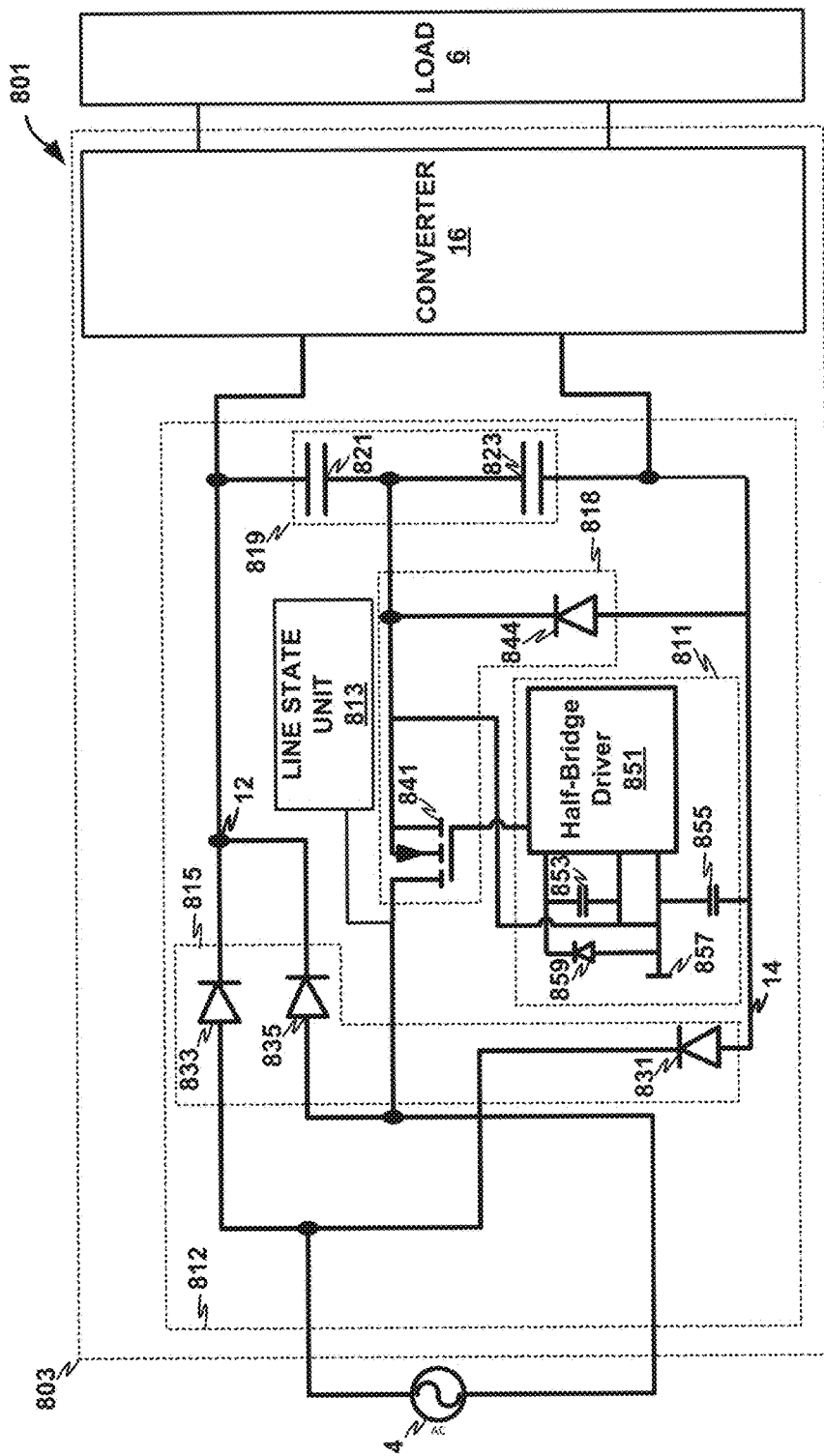
FIG. 9B is a circuit diagram illustrating an example second voltage doubler rectifier, in accordance with one or more techniques of this disclosure.

FIG. 9B is a circuit diagram illustrating an example second voltage doubler rectifier 812, in accordance with one or more techniques of this disclosure. FIG. 9B is described below within the context of capacitor switching system 1 of FIG. 1. However, the techniques described below can be used in any permutation, and in any combination, with voltage rail 12, reference node 14, capacitor 18, capacitor modules 20, and converter 16 to increase a voltage received by converter 16. As illustrated in the example of FIG. 9B, voltage doubler switching system 801 includes rectifier 815, line state unit 813, series string 819, and driver 811 as described in FIG. 9A. As shown, adapter 803 of voltage doubler switching system 801 may include switching unit 818 instead of switching unit 817 of FIG. 9A. Switching unit 818, similarly to switching unit 817 of FIG. 9A, may include voltage controlled circuit element 841. As shown, switching unit 818 may include diode 844 instead of voltage controlled circuit element 843. Diode 844 may include an anode coupled to reference node 14 and a cathode coupled to the second node of capacitor 821.

Figure 9C:
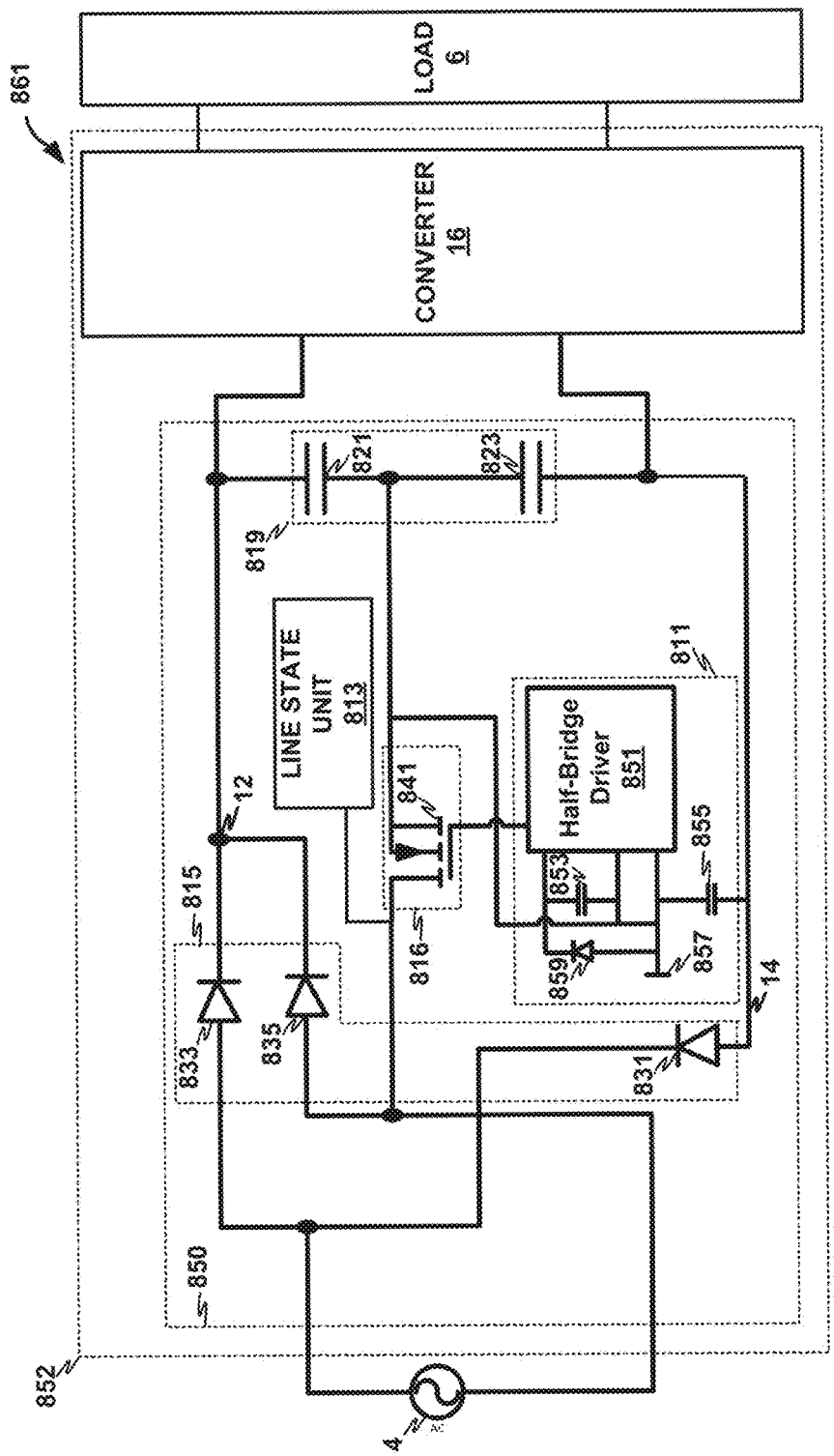
FIG. 9C is a circuit diagram illustrating an example third voltage doubler rectifier, in accordance with one or more techniques of this disclosure.

FIG. 9C is a circuit diagram illustrating an example third voltage doubler rectifier 850, in accordance with one or more techniques of this disclosure. FIG. 9C is described below within the context of capacitor switching system 1 of FIG. 1. However, the techniques described below can be used in any permutation, and in any combination, with voltage rail 12, reference node 14, capacitor 18, capacitor modules 20, and converter 16 to increase a voltage received by converter 16. As illustrated in the example of FIG. 9C, voltage doubler switching system 861 includes rectifier 815, line state unit 813, series string 819, and driver 811 as described in FIG. 9A. In the example of FIG. 9C, capacitor 823 of series string 819 is bipolar (e.g., ceramic, polyester film (e.g., MYLAR), or another bipolar capacitor). As shown, adapter 852 of voltage doubler switching system 861 may include switching unit 816 instead of switching unit 817 of FIG. 9A. Switching unit 816, similarly to switching unit 817 of FIG. 9A, may include voltage controlled circuit element 841. As shown, switching unit 816 may omit voltage controlled circuit element 843 since capacitor 823 of series string 819 is bipolar.

Figure 10:
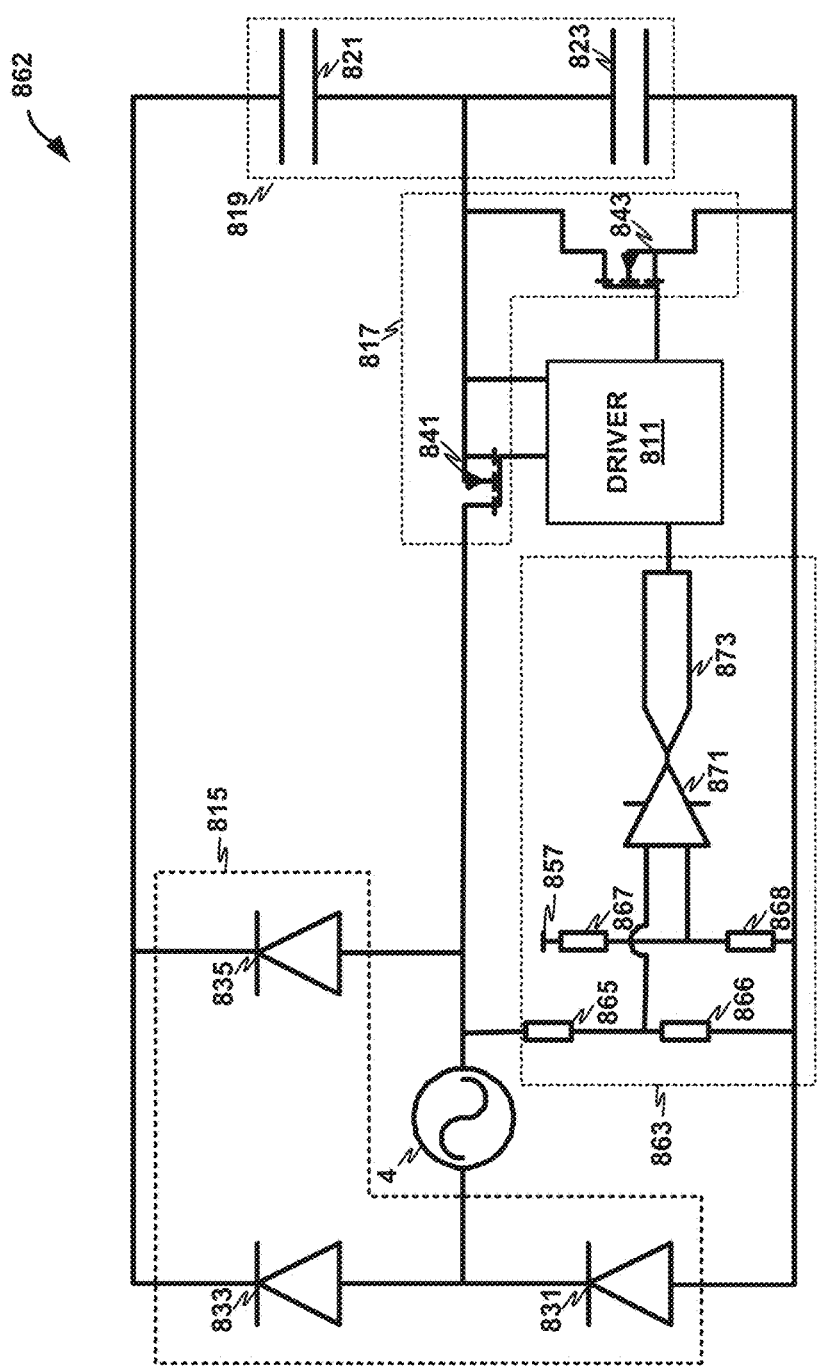
FIG. 10 is a circuit diagram illustrating an example line state unit, in accordance with one or more techniques of this disclosure.

FIG. 10 is a circuit diagram illustrating an example line state unit 863, in accordance with one or more techniques of this disclosure. Line state unit 863 may be configured to control driver 811 to operate voltage doubler switching system 862 in a first state (e.g., high-line) or a second state (e.g., low-line). As shown, line state unit 863 may include a first voltage divider indicating a voltage of AC voltage source 4 that is formed by resistive element 865 and resistive element 866, a second voltage divider indicating a voltage of reference that is formed by resistive element 867 and resistive element 868, a comparator 871, and a state machine 873.

State machine 873 may be configured to start in the first state (e.g., high-line) such that capacitor 853 of driver 811 as shown in FIG. 9A is charged (e.g., for 1 millisecond) before switching to the second state (e.g., low-line). In this manner, capacitor 853 may be fully charged to ensure that driver 811 may turn on voltage controlled circuit element 841. State machine 873 may include an analog circuit. In some examples, state machine 873 may be a microcontroller on a single integrated circuit containing a processor core, memory, inputs, and outputs. In some examples, state machine 873 may be a combination of one or more analog components and one or more digital components.

Figure 11A:
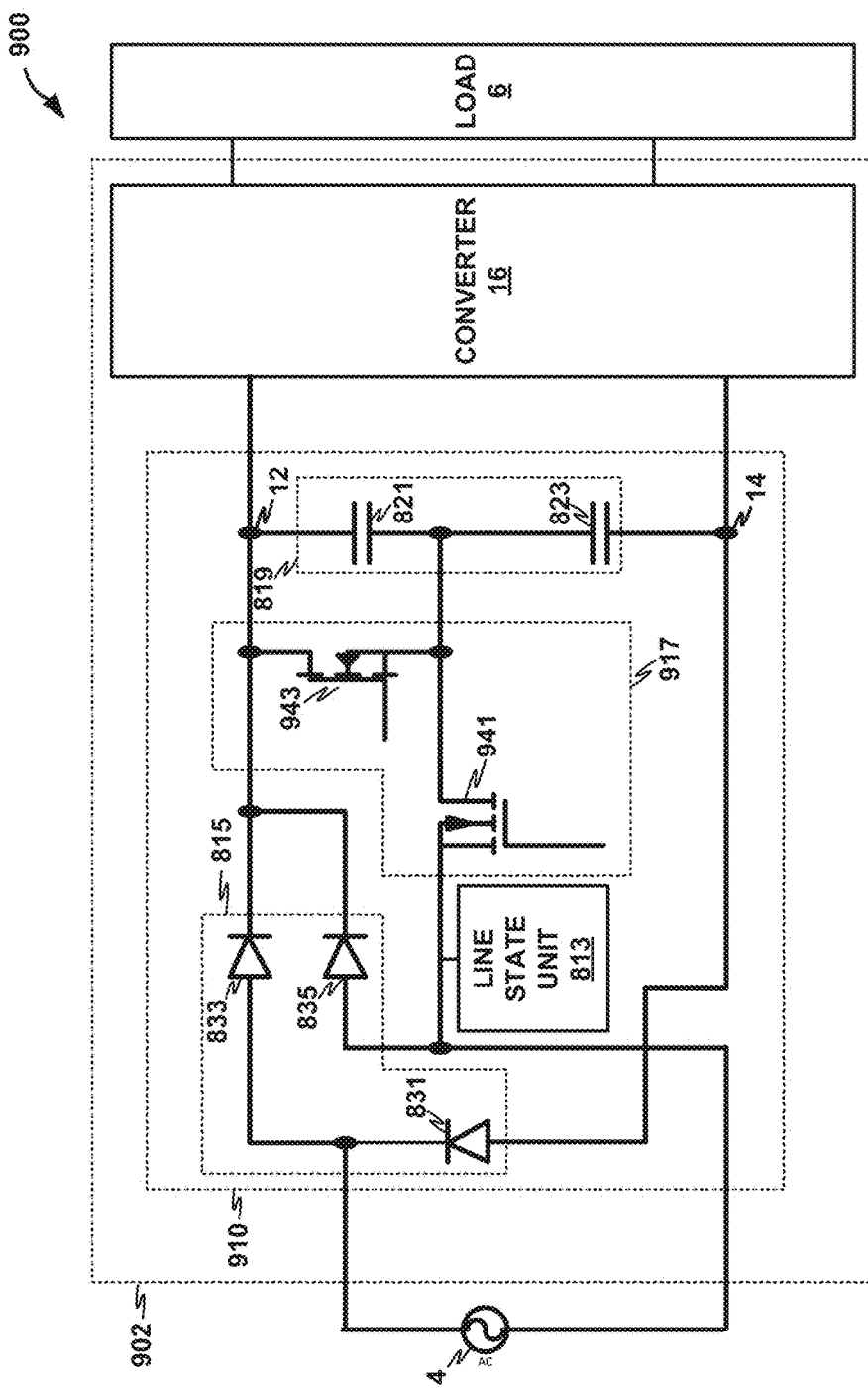
FIG. 11A is a circuit diagram illustrating an example fourth voltage doubler rectifier, in accordance with one or more techniques of this disclosure.

FIG. 11A is a circuit diagram illustrating an example fourth voltage doubler rectifier 910, in accordance with one or more techniques of this disclosure. FIG. 11A is described below within the context of capacitor switching system 1 of FIG. 1. However, the techniques described below can be used in any permutation, and in any combination, with AC voltage source 4, capacitor 18, capacitor modules 20, converter 16, and load 6 to increase a voltage received by converter 16. As illustrated in the example of FIG. 11A, voltage doubler switching system 900 includes adapter 902 including rectifier 815 and series string 819 that includes capacitor 821 and capacitor 823 as described in FIG. 9A and line state unit 813 as described in FIG. 10. As shown, voltage doubler switching system 900 includes switching unit 917 instead of switching unit 817.

Switching unit 917 may be configured to selectively switch capacitor 821 and capacitor 823 such that a peak voltage of series string 819 is greater than a peak voltage of rectified AC voltage supplied by rectifier 815. As shown, switching unit 917 includes voltage controlled circuit element 941 and voltage controlled circuit element 943. Although a MOSFET symbol is shown in FIG. 11A as voltage controlled circuit element 941 and voltage controlled circuit element 943, any electrical device that is controlled by a voltage may be used in place of the MOSFET as described in FIG. 11A. Additionally, although examples may illustrate switching unit 917 using a voltage-controlled element, in some examples, switching unit 917 may use a current-controlled element. As shown, voltage controlled circuit element 941 may include first node (e.g., a drain) coupled to the second node of capacitor 821, a second node (e.g., a source) coupled to the first node of AC voltage source 4, and a control node (e.g., a gate). As shown, voltage controlled circuit element 943 may include first node (e.g., a drain) coupled to voltage rail 12, a second node (e.g., a source) coupled to the second node of capacitor 821, and a control node (e.g., a gate). It should be understood that a depletion FET may be used as voltage controlled circuit element 941 and/or voltage controlled circuit element 943. In this manner, voltage doubler switching system 900 permits capacitor 821 to have a voltage rating that is half of a full input voltage supplied by AC voltage source 4, thereby further reducing a volume of adapter 902.

Figure 11B:
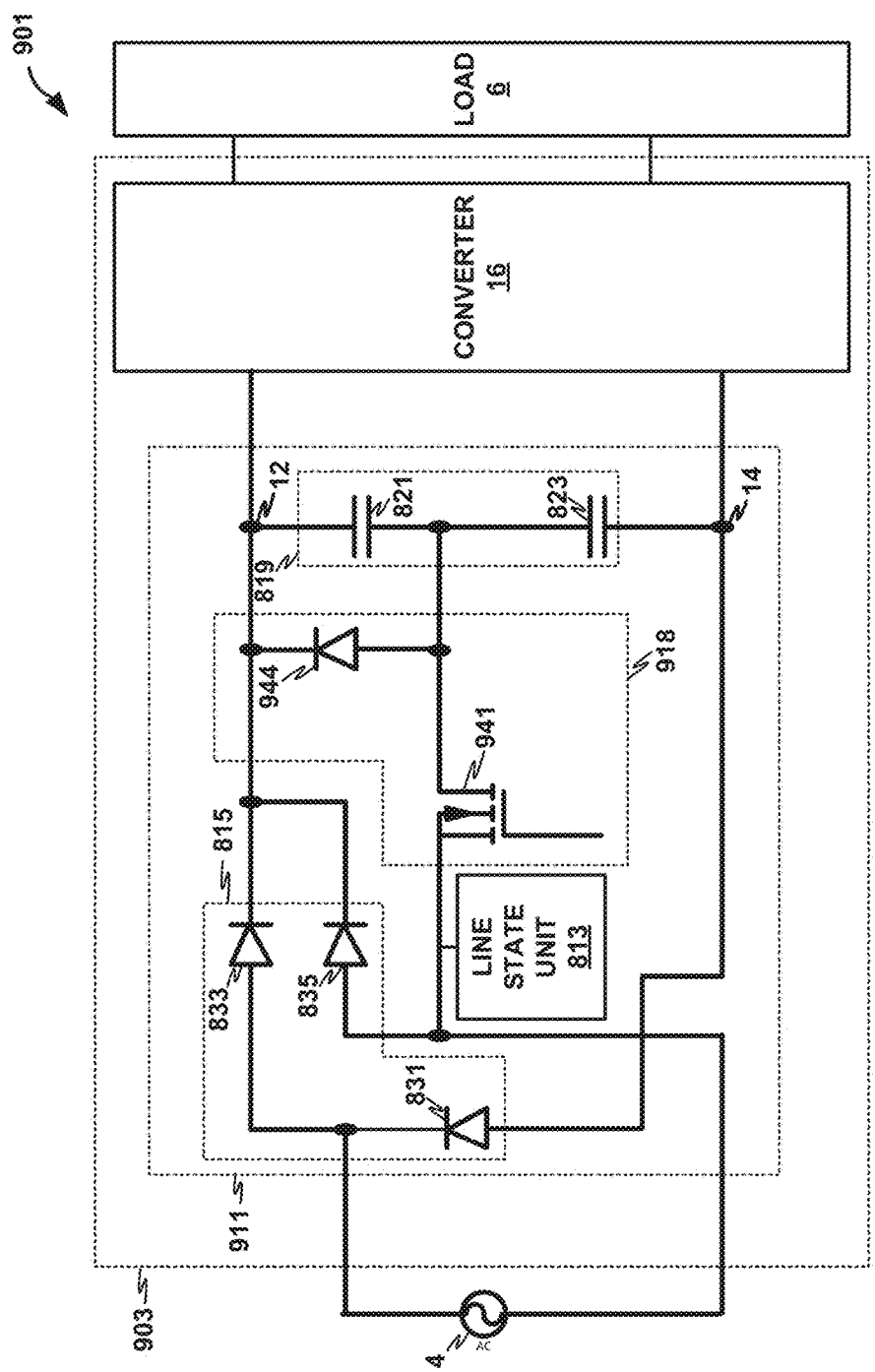
FIG. 11B is a circuit diagram illustrating an example fifth voltage doubler rectifier, in accordance with one or more techniques of this disclosure.

FIG. 11B is a circuit diagram illustrating an example fifth voltage doubler rectifier 911, in accordance with one or more techniques of this disclosure. FIG. 11B is described below within the context of capacitor switching system 1 of FIG. 1. However, the techniques described below can be used in any permutation, and in any combination, with voltage rail 12, reference node 14, capacitor 18, capacitor modules 20, and converter 16 to increase a voltage received by converter 16. As illustrated in the example of FIG. 11B, voltage doubler switching system 901 includes rectifier 815, line state unit 813, series string 819, and driver 811 as described in FIG. 9A. As shown, adapter 903 of voltage doubler switching system 903 may include switching unit 918 instead of switching unit 917 of FIG. 11A. Switching unit 918, similarly to switching unit 917 of FIG. 11A, may include voltage controlled circuit element 941. As shown, switching unit 918 may include diode 944 instead of voltage controlled circuit element 943. Diode 944 may include an anode coupled to reference node 14 and a cathode coupled to the second node of capacitor 821.

Figure 12:
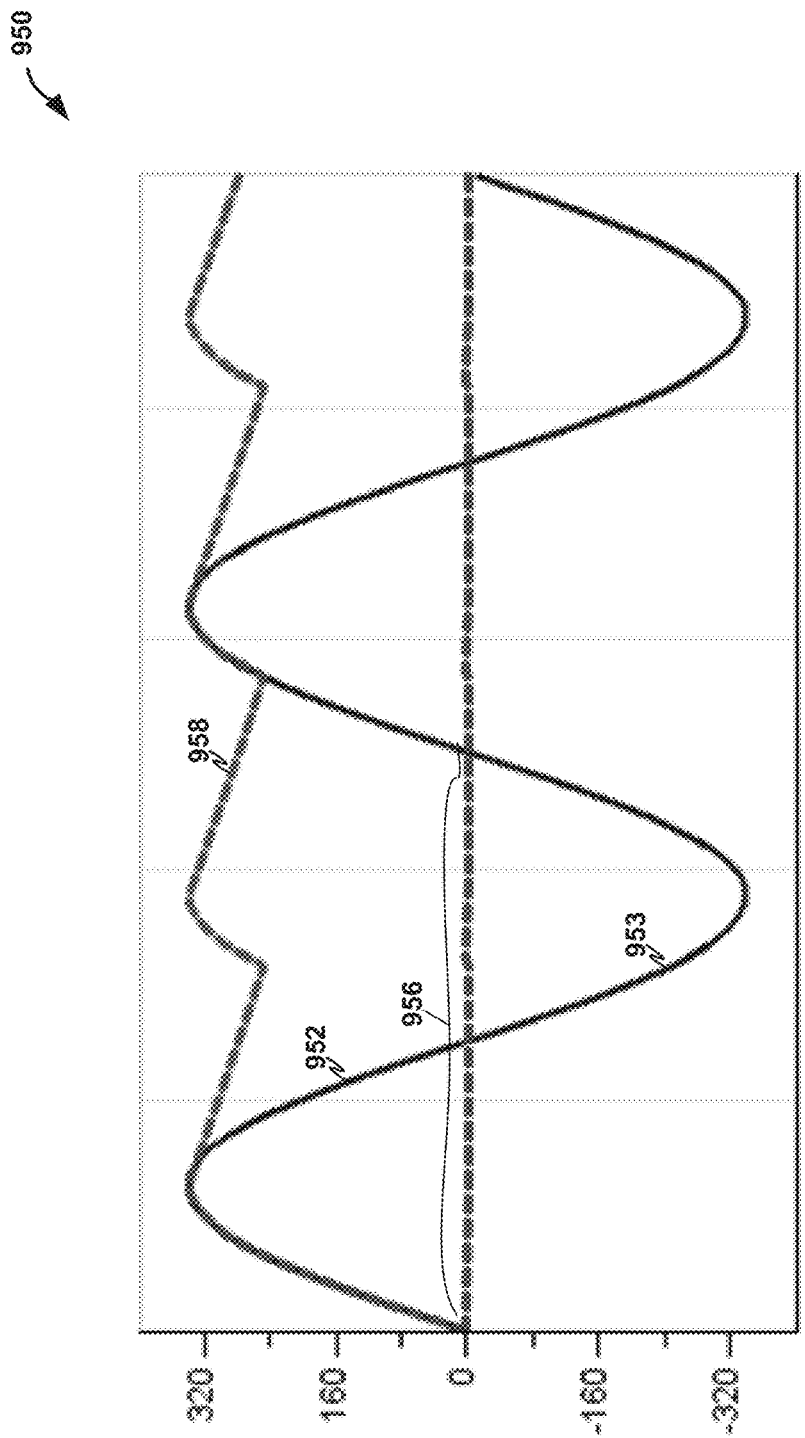
FIG. 12 is a diagram illustrating an exemplary high-line operation, in accordance with one or more techniques of this disclosure.

FIG. 12 is a diagram illustrating an exemplary high-line operation 950, in accordance with one or more techniques of this disclosure. FIG. 12 is described below within the context of voltage doubler switching system 800 of FIG. 9A. However, the techniques described below can be used in any permutation, and in any combination, with AC voltage source 4, rectifier 815, driver 811, switching unit 817, line state unit 813, series string 819, converter 16, and load 6 to increase a voltage received by converter 16.

As shown, AC voltage source 4 supplies voltage 952 in a first direction (e.g., positive) during a first half of a cycle 956 and supplies voltage 953 in a second direction during a second half of the cycle 956, the first direction being opposite from the second direction. In the exemplary high-line operation 950, voltage controlled circuit element 841 of FIG. 9A is operating in an open state and voltage controlled circuit element 843 is operating in a closed state. As such, capacitor 821 is charged by both voltage 952 and voltage 953 and capacitor 823 is bypassed, therefore the voltage output from first voltage doubler rectifier 810 into converter 16 is the same as the voltage across capacitor 821, shown in FIG. 12 as voltage 958.

Figure 13:
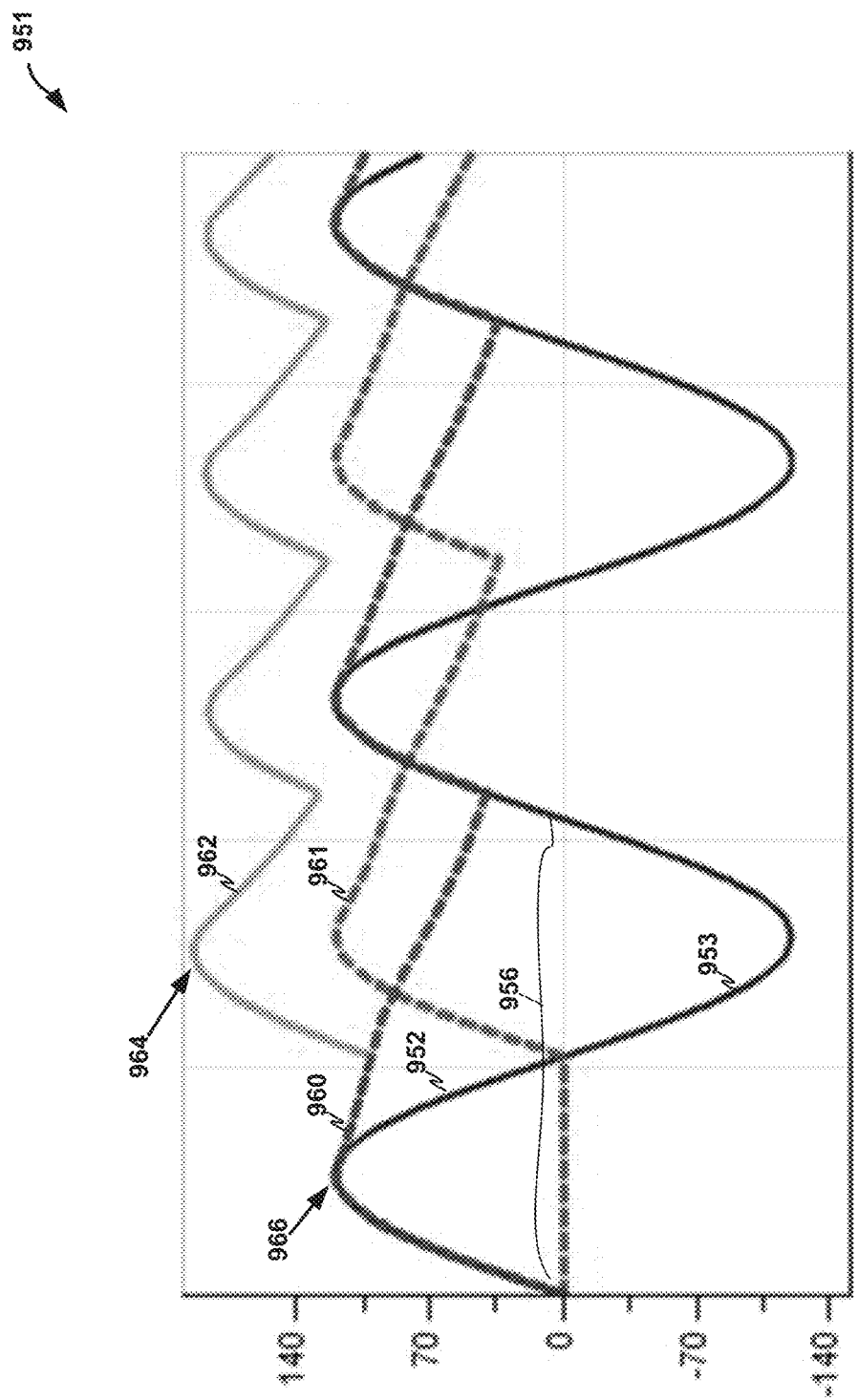
FIG. 13 is a diagram illustrating an exemplary low-line operation, in accordance with one or more techniques of this disclosure.

FIG. 13 is a diagram illustrating an exemplary low-line operation, in accordance with one or more techniques of this disclosure. FIG. 13 is described below within the context of voltage doubler switching system 800 of FIG. 9A. However, the techniques described below can be used in any permutation, and in any combination, with AC voltage source 4, rectifier 815, driver 811, switching unit 817, line state unit 813, series string 819, converter 16, and load 6 to increase a voltage received by converter 16.

As shown, AC voltage source 4 supplies voltage 952 in a first direction (e.g., positive) during a first half of a cycle 956 and supplies voltage 953 in a second direction during a second half of the cycle 956, the first direction being opposite from the second direction. In the exemplary low-line operation 951, voltage controlled circuit element 841 of FIG. 9A is operating in a closed state and voltage controlled circuit element 843 is operating in an open state. As such, capacitor 821 is charged by voltage 952 to voltage 960 and capacitor 823 is charged by voltage 953 to voltage 961, therefore the voltage output from first voltage doubler rectifier 810 into converter 16 is the sum of the instantaneous voltages 960 and 961, shown in FIG. 13 as voltage 962. In this manner, switching unit 817 may be configured to selectively switch capacitor 821 and capacitor 823 such that voltage 962 of series string 819 has a peak voltage 964 (e.g., ~170 Volts) that is greater than a peak voltage 966 (e.g., ~85 Volts) of voltage 952.

Figure 14:
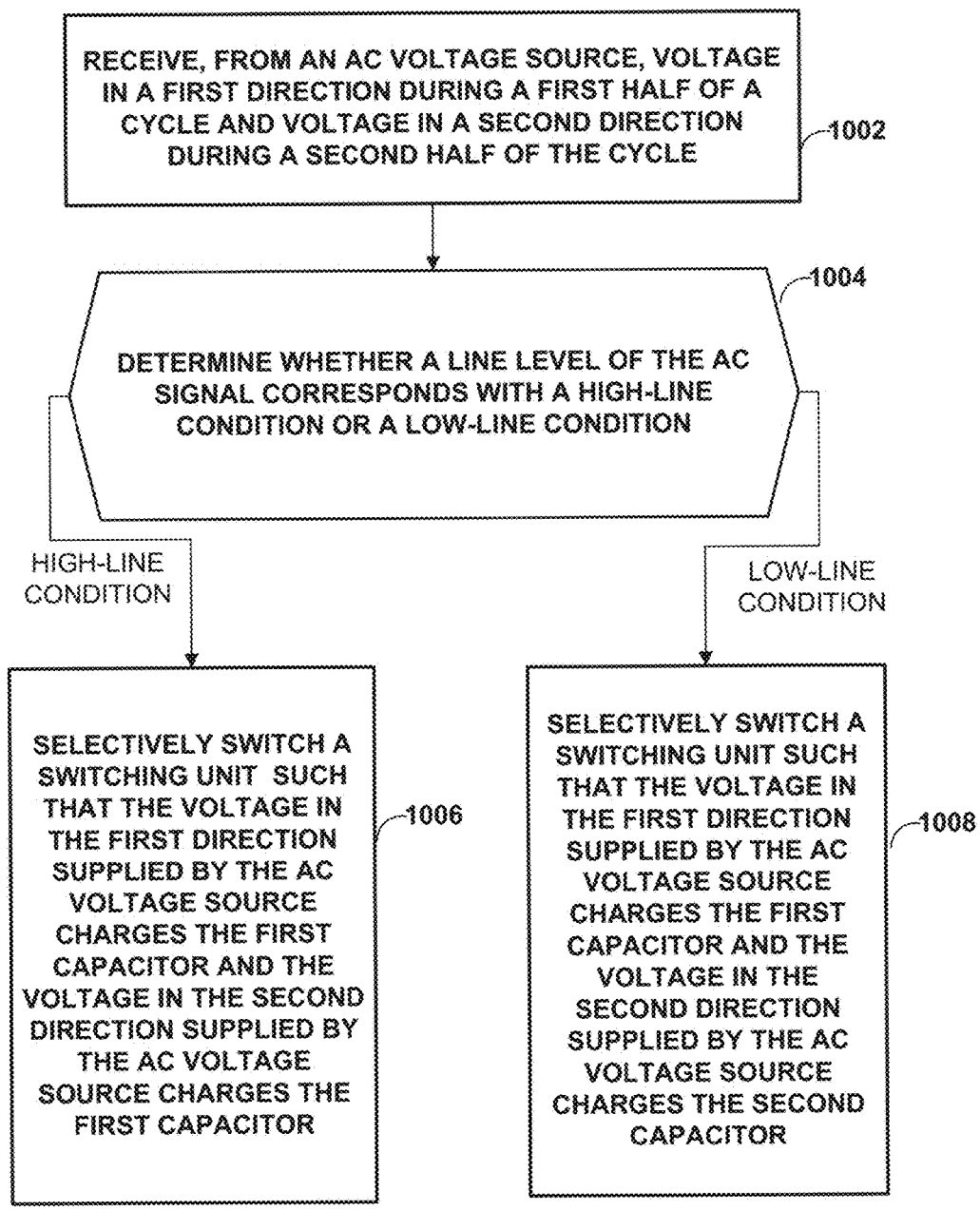
FIG. 14 is a flow diagram consistent with techniques that may be performed by a circuit in accordance with this disclosure.

FIG. 14 is a flow diagram consistent with techniques that may be performed by a circuit in accordance with this disclosure. For purposes of illustration only, the example operations are described below within the context of voltage doubler switching system 800, as shown in FIG. 9A. However, the techniques described below can be used in any permutation, and in any combination, with AC voltage source 4, rectifier 815, switching unit 817, driver 811, line state unit 813, series string 819, converter 16, and load 6 to increase a voltage received by converter 16.

In accordance with one or more techniques of this disclosure, rectifier 815 of adapter 802, receives, from AC voltage source 4, an AC voltage including a voltage in a first direction during a first half of a cycle and a voltage in a second direction during a second half of the cycle (1002). Driver 811 determines whether a line level of the AC voltage corresponds with a high-line condition or a low-line condition (1004). For example, comparator 871 of FIG. 10 may determine that the AC voltage corresponds with a high-line condition when a voltage output by the first voltage divider formed by resistive element 865 and resistive element 866 is greater than a voltage output by the second voltage divider formed by resistive element 867 and resistive element 868. In another example, one or more voltage estimation units 32 may determine whether a line level of the AC voltage corresponds with a high-line condition or a low-line condition. It should be understood that, in some examples, one or more voltage estimation units 32 may be used to estimate a voltage and/or determine whether a line level of the AC signal corresponds with a high-line condition or a low-line condition while omitting one or more other components. For instance, voltage estimation unit 32A may be used to determine whether a line level of the AC voltage corresponds with a high-line condition or a low-line condition while omitting switching unit 34A, capacitor 36A, and startup unit 38A.

In response to determining that the line level of the AC voltage corresponds with the high-line condition ("HIGH-LINE CONDITION" of 1004), switching unit 817 selectively switches such that the voltage in the first direction supplied by the AC voltage source charges the first capacitor and the voltage in the second direction supplied by the AC voltage source charges the first capacitor (1006). For example, driver 811 may operate in a first state (e.g., high-line condition) that generates a logical '0' gate signal for voltage controlled circuit element 841 and a logical '1' gate signal for voltage controlled circuit element 843 such that the voltage in the first direction supplied by AC voltage source 4 charges capacitor 821 of FIG. 9A and the voltage in the second direction supplied by AC voltage source 4 also charges capacitor 821 of FIG. 9A.

On the other hand, in response to determining that the line level of the AC voltage corresponds with the low-line condition ("LOW-LINE CONDITION" of 1004), switching unit 817 selectively switches such that the voltage in the first direction supplied by the AC voltage source charges the first capacitor and the voltage in the second direction supplied by the AC voltage source charges the second capacitor (1008). For example, driver 811 may operate in a second state (e.g., low-line condition) that generates a logical '1' gate signal for voltage controlled circuit element 841 and a logical '0' gate signal for voltage controlled circuit element 843 such that the voltage in the first direction supplied by AC voltage source 4 charges capacitor 821 of FIG. 9 and the voltage in the second direction supplied by AC voltage source 4 also charges capacitor 823 of FIG. 9A.

Figure 15:
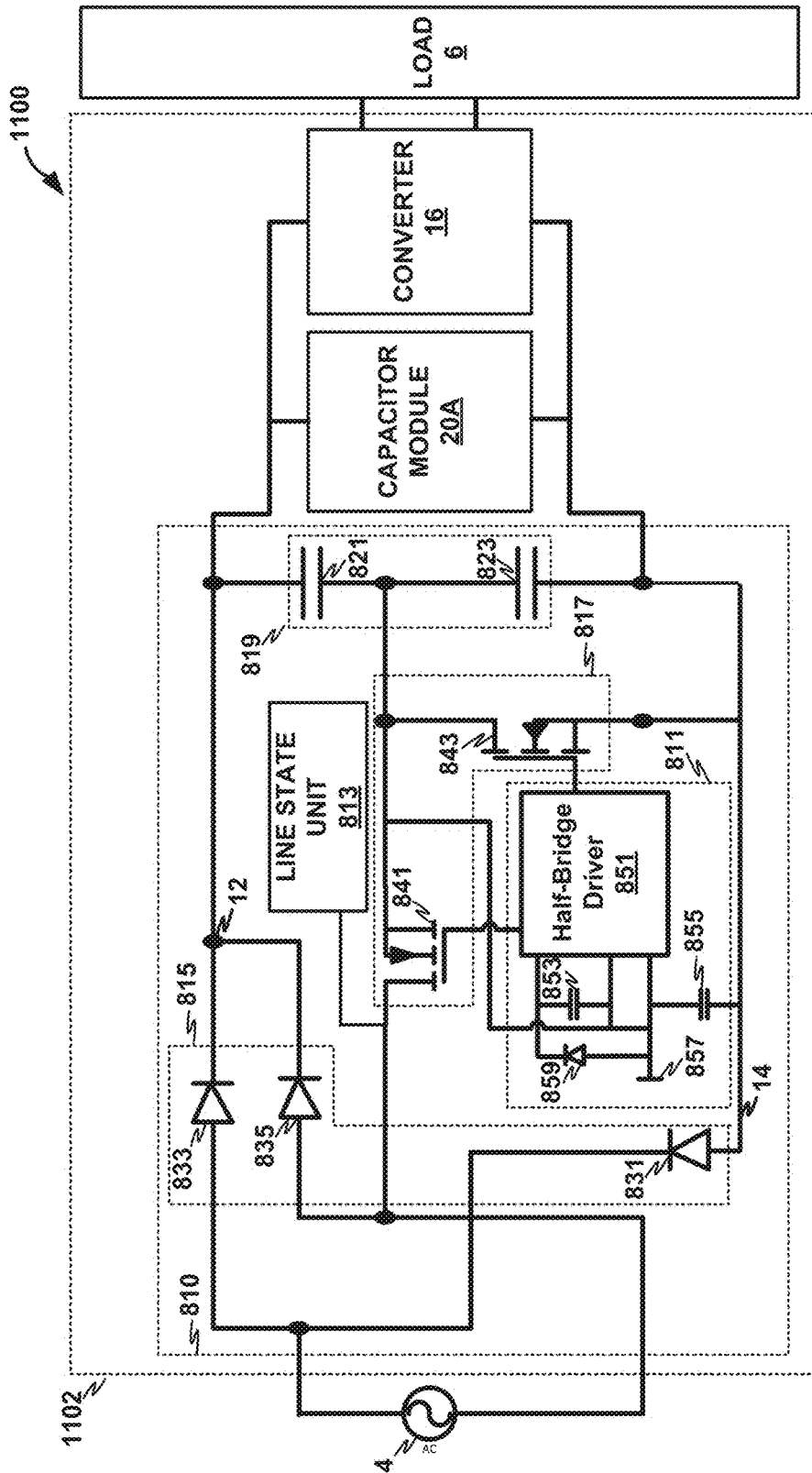
FIG. 15 is a circuit diagram illustrating an example first voltage doubler rectifier and capacitor switching system, in accordance with one or more techniques of this disclosure.

FIG. 15 is a circuit diagram illustrating an example first voltage doubler rectifier and capacitor switching system 1100, in accordance with one or more techniques of this disclosure. FIG. 15 is described below within the context of capacitor switching system 1 of FIG. 1. However, the techniques described below can be used in any permutation, and in any combination, with voltage rail 12, reference node 14, capacitor 18, capacitor modules 20, and converter 16 to increase a voltage received by converter 16. As illustrated in the example of FIG. 15, first voltage doubler rectifier and capacitor switching system 1100 includes first voltage doubler rectifier 810 as described in FIG. 9A rather than rectifier 10 and capacitor module 20A coupled in parallel with series string 819. In some instances, first voltage doubler rectifier and capacitor switching system 1100 may include more than one of capacitor modules 20, for instance, capacitor modules 20A-N.

In accordance with one or more techniques described herein, rather than charging a single capacitor using a rectified AC voltage supplied by AC voltage source 4 and coupling a capacitor in parallel with converter 16 regardless of the rectified AC voltage, first voltage doubler rectifier and capacitor switching system 1100 may be configured to separately charge multiple capacitors using the rectified AC voltage supplied by AC voltage source 4 as well as selectively increase a capacitance between voltage rail 12 and reference node 14 at low voltages. In this manner, first voltage doubler rectifier and capacitor switching system 1100 may output a peak voltage that is greater than a peak voltage supplied by AC voltage source 4 and reduce the voltage ripple of a rectified. AC voltage to improve an efficiency of converter 16 while reducing a volume of adapter 1102.

Figure 16:
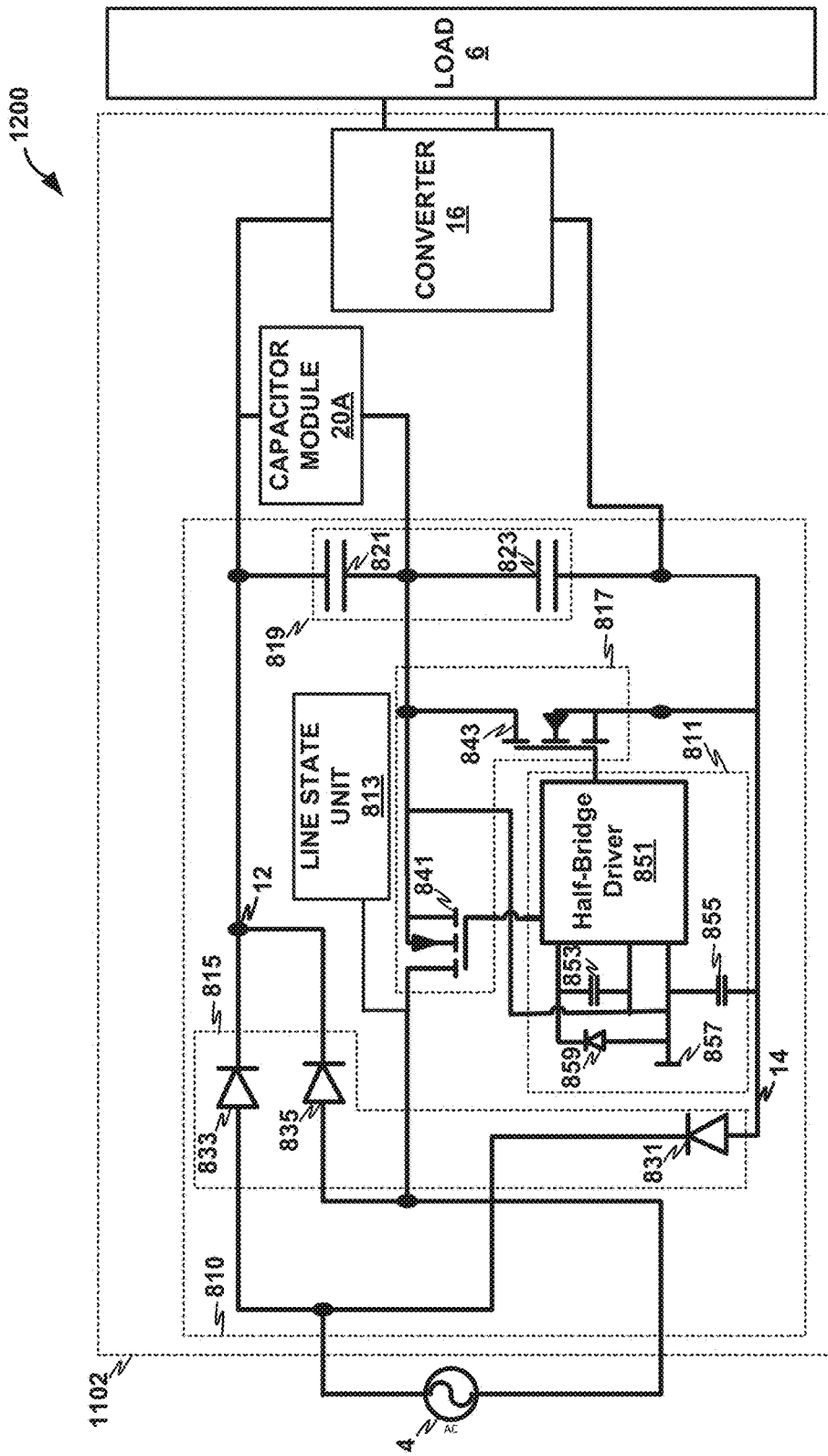
FIG. 16 is a circuit diagram illustrating an example second voltage doubler rectifier and capacitor switching system, in accordance with one or more techniques of this disclosure.

FIG. 16 is a circuit diagram illustrating an example second voltage doubler rectifier and capacitor switching system 1200, in accordance with one or more techniques of this disclosure. FIG. 16 is described below within the context of capacitor switching system 1 of FIG. 1. However, the techniques described below can be used in any permutation, and in any combination, with voltage rail 12, reference node 14, capacitor 18, capacitor modules 20, and converter 16 to increase a voltage received by converter 16. As illustrated in the example of FIG. 16, second voltage doubler and capacitor switching system 1200 includes first voltage doubler rectifier 810 as described in FIG. 9A rather than rectifier 10 and capacitor module 20A coupled in parallel with capacitor 821 rather than series string 819. In some instances, second voltage doubler rectifier and capacitor switching system 1200 may include more than one of capacitor modules 20, for instance, capacitor modules 20A-N.

In accordance with one or more techniques described herein, rather than charging a single capacitor using a rectified AC voltage supplied by AC voltage source 4 and coupling a capacitor in parallel with capacitor 821 regardless of the rectified AC voltage, second voltage doubler rectifier and capacitor switching system 1200 may be configured to separately charge multiple capacitors using the rectified AC voltage supplied by AC voltage source 4 as well as selectively increase an effective capacitance of capacitor 821 at low voltages. In this manner, second voltage doubler rectifier and capacitor switching system 1200 may output a peak voltage that is greater than a peak voltage supplied by AC voltage source 4 and effectively reduce the voltage ripple of a rectified AC voltage to improve an efficiency of converter 16 while reducing a volume of adapter 1102.

Figure 17:
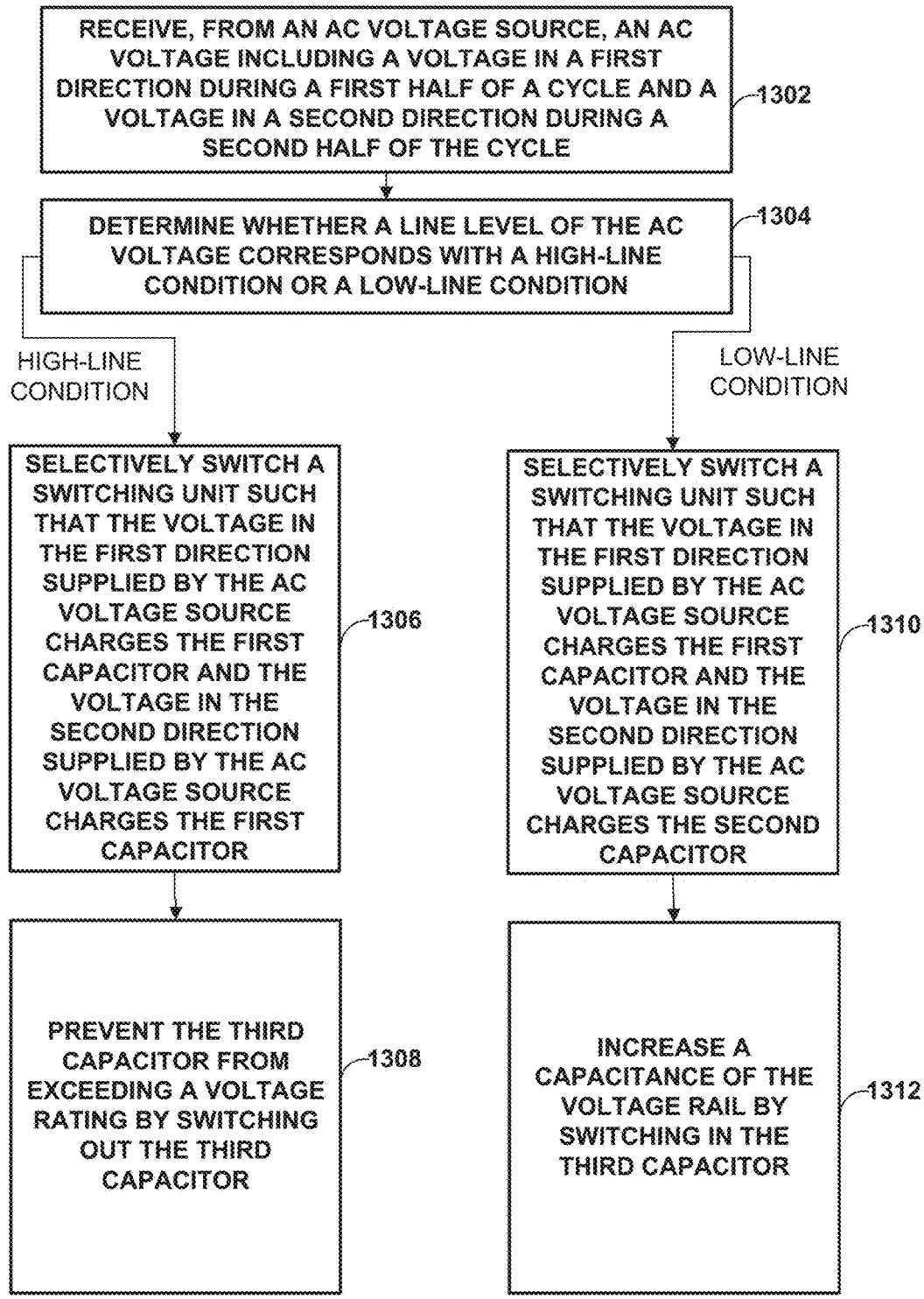
FIG. 17 is a flow diagram consistent with techniques that may be performed by a circuit in accordance with this disclosure.

FIG. 17 is a flow diagram consistent with techniques that may be performed by a circuit in accordance with this disclosure. For purposes of illustration only, the example operations are described below within the context of first voltage doubler rectifier and capacitor switching system 1100, as shown in FIG. 15. However, the techniques described below can be used in any permutation, and in any combination, with AC voltage source 4, rectifier 815, switching unit 817, driver 811, line state unit 813, series string 819, converter 16, and load 6 to reduce the voltage ripple of a DC voltage and increase a voltage received by converter 16.

In accordance with one or more techniques of this disclosure, rectifier 815 of adapter 1102 receives, from AC voltage source 4, an AC voltage including a voltage in a first direction during a first half of a cycle and a voltage in a second direction during a second half of the cycle (1302). Next, driver 811 determines whether a line level of the AC voltage corresponds with a high-line condition or a low-line condition (1304). For example, comparator 871 of FIG. 10 may determine that the AC signal corresponds with a high-line condition when a voltage output by the first voltage divider formed by resistive element 865 and resistive element 866 is greater than a voltage output by the second voltage divider formed by resistive element 867 and resistive element 868. In another example, one or more voltage estimation units 32 may determine whether a line level of the AC voltage corresponds with a high-line condition or a low-line condition.

In response to determining that the line level of the AC voltage corresponds with the high-line condition ("HIGH-LINE CONDITION" of 1304), switching unit 817 selectively switches such that the voltage in the first direction supplied by the AC voltage source charges the first capacitor and the voltage in the second direction supplied by the AC voltage source charges the first capacitor (1306). For example, driver 811 may operate in a first state (e.g., high-line condition) that generates a logical '0' gate signal for voltage controlled circuit element 841 and a logical '1' gate signal for voltage controlled circuit element 843 such that the voltage in the first direction supplied by AC voltage source 4 charges capacitor 821 of FIG. 15 and the voltage in the second direction supplied by AC voltage source 4 charges capacitor 821 of FIG. 15. Additionally, in response to determining that the line level of the AC voltage corresponds with the high-line condition ("HIGH-LINE CONDITION" of 1304), capacitor module 20A prevents capacitor 36A of FIG. 1 from exceeding a voltage rating by switching out capacitor 36A (1308). For example, switching unit 34A of capacitor module 20A operates in an open state during the high-line condition.

On the other hand, in response to determining that the line level of the AC voltage corresponds with the low-line condition ("LOW-LINE CONDITION" of 1304), switching unit 817 selectively switches such that the voltage in the first direction supplied by the AC voltage source charges the first capacitor and the voltage in the second direction supplied by the AC voltage source charges the second capacitor (1310). For example, driver 811 may operate in a second state (e.g., low-line condition) that generates a logical '1' gate signal for voltage controlled circuit element 841 and a logical '0' gate signal for voltage controlled circuit element 843 such that the voltage in the first direction supplied by AC voltage source 4 charges capacitor 821 of FIG. 15 and the voltage in the second direction supplied by AC voltage source 4 charges capacitor 823 of FIG. 15. Additionally, in response to determining that the line level of the AC voltage corresponds with the low-line condition ("LOW-LINE CONDITION" of 1304), capacitor module 20A increases a capacitance of voltage rail 12 by switching in capacitor 36A of FIG. 1 (1312). For example, switching unit 34A of capacitor module 20A may operate in a closed state such that a capacitance of 36A is added to a total capacitance of series string 819 as shown in FIG. 15. In some examples, switching unit 34A of capacitor module 20A may operate in a closed state such that a capacitance of 36A is added to a capacitance of capacitor 821 as shown in FIG. 16.

The following examples may illustrate one or more aspects of the disclosure.

Example 1

A circuit comprising: a voltage rail; a reference node; a first capacitor coupled to the voltage rail and to the reference node; and a capacitor module comprising: a second capacitor; and a switching unit configured to operate in a closed state and an open state, wherein the switching unit couples the second capacitor in parallel with the first capacitor in the closed state, and wherein the switching unit decouples the second capacitor from the first capacitor in the open state.

Example 2

The circuit of example 1, further comprising: a voltage source coupled to the voltage rail and the reference node.

Example 3

The circuit of any combination of examples 1-2, wherein: the switching unit comprises a voltage controlled circuit element including a first node coupled to the voltage rail, a second node, and a control node; and the second capacitor includes a first node coupled to the second node of the voltage controlled circuit element of the switching unit and a second node coupled to the reference node.

Example 4

The circuit of any combination of examples 1-3, further comprising: a first resistive element including a first node and a second node, the first node of the first resistive element being coupled to the second node of the voltage controlled circuit element of the switching unit and the first node of the second capacitor; and a second resistive element including a first node coupled to the second node of the first resistive element and to the control node of the voltage controlled circuit element of the switching unit and a second node coupled to the reference node.

Example 5

The circuit of any combination of examples 1-4, further comprising: a first resistive element including a first node and a second node, the first node of the first resistive element being coupled to the voltage rail; a second resistive element including a first node coupled to the second node of the first resistive element and a second node coupled to the reference node; and a comparator including an output, a first input coupled to a reference voltage, and a second input coupled to the second node of the first resistive element, wherein the switching unit selectively couples the second capacitor to the voltage rail and the reference node based on a signal generated on the output of the comparator.

Example 6

The circuit of any combination of examples 1-5, further comprising: a controller including a first input, a second input, and an output; a transformer of a converter, the transformer comprising at least a first winding and a second winding, the first winding of the transformer including a first node and a second node and the second winding of the transformer being coupled to the output of the converter; a first resistive element including a first node coupled to the first node of the first winding and a second node coupled to the first input of the controller; and a second resistive element including a first node coupled to the first input of the controller and a second node coupled to the second input of the controller and the second node of the first winding, wherein the switching unit selectively couples the second capacitor to the voltage rail and the reference node based on a signal generated on the output of the controller.

Example 7

The circuit of any combination of examples 1-6, wherein the capacitor module includes a startup unit, the startup unit comprising: a voltage controlled circuit element including a first node coupled to the voltage rail, a second node coupled to the first node of the second capacitor, and a control node; a first resistive element including a first node coupled to the second node of the voltage controlled circuit element of the startup unit and a second node coupled to the control node of the voltage controlled circuit element of the startup unit; and a second resistive element including a first node coupled to the control node of the voltage controlled circuit element of the startup unit and a second node coupled to the reference node.

Example 8

The circuit of any combination of examples 1-7, further comprising: a second capacitor module comprising at least: a third capacitor; and a switching unit configured to operate in a closed state and an open state, wherein the switching unit of the second capacitor module couples the third capacitor in parallel with first capacitor in the closed state, and wherein the switching unit of the second capacitor module decouples the third capacitor from the first capacitor in the open state.

Example 9

The circuit of any combination of examples 1-8, wherein the first capacitor has a lower capacitance than the second capacitor; and the first capacitor has a higher voltage rating than the second capacitor.

Example 10

The circuit of any combination of examples 1-9, wherein: the first capacitor is a parasitic capacitance of the circuit.

Example 11

A method comprising: estimating, by a circuit, a voltage between a voltage rail and a reference node; determining, by the circuit, whether the voltage between the voltage rail and the reference node exceeds a voltage threshold in response to estimating the voltage between the voltage rail and the reference node; and increasing, by the circuit, a capacitance between the voltage rail and the reference node by selectively coupling, by the circuit, a capacitor to the voltage rail and to the reference node in response to determining that the voltage between the voltage rail and the reference node does not exceed the voltage threshold.

Example 12

The method according to example 11, comprising: decoupling, by the circuit, the capacitor from the voltage rail and the reference node in response to determining that the voltage between the voltage rail and the reference node exceeds a second voltage threshold.

Example 13

The method of any combination of examples 11-12, wherein: estimating the voltage between the voltage rail and the reference node comprises estimating, by the circuit, a voltage of the capacitor.

Example 14

The method of any combination of examples 11-13, wherein: estimating the voltage between the voltage rail and the reference node comprises estimating, by the circuit, a voltage on a first winding of a transformer, and the transformer includes a second winding coupled to an output of a switched-mode power converter that converts the voltage between the voltage rail and the reference node to another voltage.

Example 15

The method of any combination of examples 11-14, wherein: the voltage threshold is a portion of a voltage rating of the capacitor.

Example 16

The method of any combination of examples 11-15, further comprising: determining, by the circuit, whether the voltage between the voltage rail and the reference node exceeds a second voltage threshold in response to estimating the voltage between the voltage rail and the reference node; and increasing, by the circuit, the capacitance between the voltage rail and the reference node by selectively coupling, by the circuit, a second capacitor to the voltage rail and to the reference node in response to determining, by the circuit, that the voltage between the voltage rail and the reference node does not exceed the second voltage threshold.

Example 17

The method of any combination of examples 11-16, comprising: coupling, by a startup unit of the circuit, the capacitor to the voltage rail and to the reference node; estimating, by the startup unit, a voltage of the capacitor in response to coupling the capacitor to the voltage rail and to the reference node; and selectively coupling, by the startup unit, the capacitor to the voltage rail and to the reference node based on the estimated voltage of the capacitor.

Example 18

A system, comprising: a rectifier configured to supply a rectified AC voltage to a voltage rail and a reference node; a first capacitor configured to reduce an alternating current (AC) voltage ripple of the rectified AC voltage, the first capacitor being coupled to the voltage rail and to the reference node; a capacitor module configured to reduce the AC voltage ripple of the rectified AC voltage, the capacitor module comprising: a second capacitor; and a switching unit configured to operate in a closed state and an open state, wherein the switching unit couples the second capacitor in parallel with the first capacitor in the closed state, and wherein the switching unit decouples the second capacitor from the first capacitor in the open state; and a converter coupled to the voltage rail and to the reference.

Example 19

The system of example 18, wherein the converter comprises: a switched-mode power converter configured to receive the rectified. AC voltage at a first voltage and output a DC voltage at a second voltage.

Example 20

The system of any combination of examples 18-19, further comprising: a load coupled to the output of the switched-mode power converter, the load including an electronic device configured to operate at the second voltage.

Example 21

A circuit comprising: an alternating current (AC) voltage source configured to supply voltage in a first direction during a first half of a cycle and supply voltage in a second direction during a second half of the cycle, the first direction being opposite from the second direction; a voltage rail; a reference rail; a first capacitor including a first node and a second node, the first node being coupled to the voltage rail; a second capacitor including a first node coupled to the second node of the first capacitor and a second node coupled to the reference rail; and a switching unit configured to operate the circuit in a first state and a second state, wherein during the first state of the circuit, the voltage in the first direction supplied by the AC voltage source charges the first capacitor and the voltage in the second direction supplied by the AC voltage source charges the first capacitor, and wherein during the second state of the circuit, the voltage in the first direction supplied by the AC voltage source charges the first capacitor and the voltage in the second direction supplied by the AC voltage source charges the second capacitor.

Example 22

The circuit of example 21 further comprising: a converter configured to receive a voltage between the voltage rail and the reference rail and output a direct current (DC) voltage having a different voltage than the voltage between the voltage rail and the reference rail, the converter being coupled to the voltage rail and the reference rail.

Example 23

The circuit of any combination of examples 21-22, wherein: the switching unit comprises a first voltage controlled circuit element including a first node coupled to a first node of the AC voltage source, a second node coupled to the second node of the first capacitor, and a control node.

Example 24

The circuit of any combination of examples 21-23, wherein: the first voltage controlled circuit element is configured to permit current to flow from the first node of the first voltage controlled circuit element to the second node of the first voltage controlled circuit element when a signal received at the control node of the first voltage controlled circuit element satisfies a threshold and configured to prevent current to flow from the first node of the first voltage controlled circuit element to the second node of the first voltage controlled circuit element when the signal received at the control node of the first voltage controlled circuit element does not satisfy the threshold, and the first voltage controlled circuit element is configured to permit current to flow from the second node of the first voltage controlled circuit element to the first node of the first voltage controlled circuit element when the signal received at the control node of the first voltage controlled circuit element does not satisfy the threshold and when the signal received at the control node of the first voltage controlled circuit element satisfies the threshold.

Example 25

The circuit of any combination of examples 21-24, wherein: the switching unit further comprises a second voltage controlled circuit element including a first node coupled to the second node of the first capacitor, a second node coupled to the reference rail, and a control node.

Example 26

The circuit of any combination of examples 21-25, wherein the switching unit further comprises a driver configured to: operate the first voltage controlled circuit element in an open state and operate the second voltage controlled circuit element in a closed state during the first state of the circuit; and operate the first voltage controlled circuit element in a closed state and operate the second voltage controlled circuit element in an open state during the second state of the circuit.

Example 27

The circuit of any combination of examples 21-25, further comprising: a first diode including an anode coupled to the reference rail and a cathode coupled to a second node of the AC voltage source; a second diode including an anode coupled to the second node of the AC voltage source and a cathode coupled to the voltage rail; and a third diode including an anode coupled to the first node of the AC voltage source and a cathode coupled to the voltage rail.

Example 28

A circuit comprising: an alternating current (AC) voltage source; a voltage rail; a reference rail; a first capacitor including a first node and a second node, the first node of the first capacitor being coupled to the voltage rail; a second capacitor including a first node coupled to the second node of the first capacitor and a second node coupled to the reference rail; a rectifier configured to receive an AC voltage from the AC voltage source and output a rectified voltage; a switching unit configured to receive the rectified voltage and selectively switch the first capacitor and the second capacitor such that a peak voltage of a series string comprising the first capacitor and the second capacitor is greater than a peak voltage of the AC voltage; and a capacitor module configured to selectively increase a capacitance between the voltage rail and the reference rail in response to determining that the rectified voltage does not exceed a voltage threshold.

Example 29

The circuit of example 28, wherein the rectifier comprises: a first diode including an anode coupled to the reference rail and a cathode coupled to a second node of the AC voltage source; a second diode including an anode coupled to the second node of the AC voltage source and a cathode coupled to the voltage rail; and a third diode including an anode coupled to the first node of the AC voltage source and a cathode coupled to the voltage rail.

Example 30

The circuit of any combination of examples 28-29, wherein the switching unit comprises a first voltage controlled circuit element including a first node coupled to a first node of the AC voltage source, a second node coupled to the second node of the first capacitor, and a control node.

Example 31

The circuit of any combination of examples 28-30, wherein the switching unit further comprises: a second voltage controlled circuit element including a first node coupled to the second node of the first capacitor, a second node coupled to the reference rail, and a control node.

Example 32

The circuit of any combination of examples 28-31, wherein the capacitor module comprises: a third capacitor; and a second switching unit configured to operate in a closed state and an open state, wherein the second switching unit couples the third capacitor in parallel with a series string comprising the first capacitor and the second capacitor in the closed state, and wherein the second switching unit decouples the third capacitor from the series string comprising the first capacitor and the second capacitor in the open state.

Example 33

The circuit of any combination of examples 28-32, wherein the capacitor module comprises: a third capacitor; and a second switching unit configured to operate in a closed state and an open state, wherein the second switching unit couples the third capacitor in parallel with the first capacitor in the closed state, and wherein the second switching unit decouples the third capacitor from the first capacitor in the open state.

Example 34

A system comprising: an alternating current (AC) voltage source; an adapter comprising: a rectifier configured to receive an AC voltage from the AC voltage source and supply a rectified voltage to a voltage rail and a reference rail; a series string comprising a first capacitor and second capacitor, the series string being coupled to the voltage rail and to the reference rail; a switching unit configured to selectively switch the first capacitor and the second capacitor such that a peak voltage of the series string comprising the first capacitor and the second capacitor is greater than a peak voltage of the AC voltage from the AC voltage source; a capacitor module configured to reduce an AC voltage ripple of the series string comprising the first capacitor and the second capacitor; and a converter configured to receive the voltage of the series string comprising the first capacitor and the second capacitor and output a direct current (DC) voltage; and a load configured to receive the DC voltage from the converter.

Example 35

The system of example 34 wherein the converter comprises: a switched-mode power converter configured to receive the rectified AC voltage at a first voltage and output a DC voltage at a second voltage.

Example 36

The system of any combination of examples 34-35, wherein the switched-mode power converter is configured to provide galvanic isolation between the AC voltage source and the load.

Example 37

The system of any combination of examples 34-36, wherein: the load is an electronic device configured to operate at the second voltage.

Example 38

The system of any combination of examples 34-37, wherein the capacitor module comprises: a third capacitor; and a switching unit configured to operate in a closed state and an open state, wherein the switching unit couples the third capacitor in parallel with the series string in the closed state, and wherein the switching unit decouples the third capacitor from the series string in the open state.

Example 39

The system of any combination of examples 34-38, wherein the capacitor module comprises: a third capacitor; and a switching unit configured to operate in a closed state and an open state, wherein the switching unit couples the third capacitor in parallel with the first capacitor in the closed state, and wherein the switching unit decouples the third capacitor from the first capacitor in the open state.

Example 40

The system of any combination of examples 34-39, wherein: the AC voltage source is configured to supply voltage in a first direction during a first half of a cycle and supply voltage in a second direction during a second half of the cycle, the first direction being opposite from the second direction; the switching unit is further configured to operate the system in a first state and a second state; during the first state of the system, the voltage in the first direction supplied by the AC voltage source charges the first capacitor and the voltage in the second direction supplied by the AC voltage source charges the first capacitor; and during the second state of the system, the voltage in the first direction supplied by the AC voltage source charges the first capacitor and the voltage in the second direction supplied by the AC voltage source charges the second capacitor.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

Various aspects have been described in this disclosure. These and other aspects are within the scope of the following claims.

The invention claimed is:
1. A circuit comprising:
a voltage rail;
a reference node;
a first capacitor coupled to the voltage rail and to the reference node;
a first capacitor module comprising:
  a second capacitor; and
  a first switching unit configured to operate in a closed state when a voltage between the voltage rail and the reference node does not exceed a first voltage threshold,
  wherein the first switching unit couples the second capacitor in parallel with the first capacitor in the closed state of the first switching unit, and
  wherein the first switching unit decouples the second capacitor from the first capacitor in an open state of the first switching unit; and
a second capacitor module comprising at least:
  a third capacitor; and
  a second switching unit configured to operate in a closed state when the voltage between the voltage rail and the reference node does not exceed a second voltage threshold,
  wherein the second switching unit couples the third capacitor in parallel with the first capacitor in the closed state of the second switching unit, and
  wherein the second switching unit decouples the third capacitor from the first capacitor in an open state of the second switching unit.

2. The circuit according to claim 1, further comprising:
a voltage source coupled to the voltage rail and the reference node.

3. The circuit according to claim 1, wherein:
the first switching unit comprises a voltage controlled circuit element including a first node coupled to the voltage rail, a second node, and a control node; and
the second capacitor includes a first node coupled to the second node of the voltage controlled circuit element of the first switching unit and a second node coupled to the reference node.

4. The circuit according to claim 3, further comprising:
a first resistive element including a first node and a second node, the first node of the first resistive element being coupled to the second node of the voltage controlled circuit element of the first switching unit and a first node of the second capacitor; and
a second resistive element including a first node coupled to the second node of the first resistive element and to the control node of the voltage controlled circuit element of the first switching unit and a second node coupled to the reference node.

5. The circuit according to claim 3, further comprising:
a first resistive element including a first node and a second node, the first node of the first resistive element being coupled to the voltage rail;
a second resistive element including a first node coupled to the second node of the first resistive element and a second node coupled to the reference node; and
a comparator including an output, a first input coupled to a reference voltage, and a second input coupled to the second node of the first resistive element,
wherein the first switching unit selectively couples the second capacitor to the voltage rail and the reference node based on a signal generated on the output of the comparator.

6. The circuit according to claim 3, further comprising:
a controller including a first input, a second input, and an output;
a transformer of a converter, the transformer comprising at least a first winding and a second winding, the first winding of the transformer including a first node and a second node and the second winding of the transformer being coupled to the output of the converter;
a first resistive element including a first node coupled to the first node of the first winding and a second node coupled to the first input of the controller; and
a second resistive element including a first node coupled to the first input of the controller and a second node coupled to the second input of the controller and the second node of the first winding,
wherein the first switching unit selectively couples the second capacitor to the voltage rail and the reference node based on a signal generated on the output of the controller.

7. The circuit according to claim 1, wherein the first capacitor module includes a startup unit, the startup unit comprising:
a voltage controlled circuit element including a first node coupled to the voltage rail, a second node coupled to a first node of the second capacitor, and a control node;
a first resistive element including a first node coupled to the second node of the voltage controlled circuit element of the startup unit and a second node coupled to the control node of the voltage controlled circuit element of the startup unit; and
a second resistive element including a first node coupled to the control node of the voltage controlled circuit element of the startup unit and a second node coupled to the reference node.

8. The circuit according to claim 1, wherein:
the first capacitor has a lower capacitance than the second capacitor; and
the first capacitor has a higher voltage rating than the second capacitor.

9. The circuit according to claim 1, wherein:
the first capacitor is a parasitic capacitance of the circuit.

10. A method comprising:
estimating, by a circuit, a voltage between a voltage rail and a reference node;
determining, by the circuit, whether the voltage between the voltage rail and the reference node exceeds a first voltage threshold in response to estimating the voltage between the voltage rail and the reference node;
increasing, by the circuit, a capacitance between the voltage rail and the reference node by selectively coupling, by the circuit, a first capacitor to the voltage rail and to the reference node in response to determining that the voltage between the voltage rail and the reference node does not exceed the first voltage threshold;
determining, by the circuit, whether the voltage between the voltage rail and the reference node exceeds a second voltage threshold in response to estimating the voltage between the voltage rail and the reference node; and
increasing, by the circuit, the capacitance between the voltage rail and the reference node by selectively coupling, by the circuit, a second capacitor to the voltage rail and to the reference node in response to determining, by the circuit, that the voltage between the voltage rail and the reference node does not exceed the second voltage threshold.

11. The method according to claim 10, comprising:
decoupling, by the circuit, the capacitor from the voltage rail and the reference node in response to determining that the voltage between the voltage rail and the reference node exceeds a third voltage threshold.

12. The method according to claim 10, wherein:
estimating the voltage between the voltage rail and the reference node comprises estimating, by the circuit, a voltage of the capacitor.

13. The method according to claim 10, wherein:
estimating the voltage between the voltage rail and the reference node comprises estimating, by the circuit, a voltage on a first winding of a transformer, and
the transformer includes a second winding coupled to an output of a switched-mode power converter that converts the voltage between the voltage rail and the reference node to another voltage.

14. The method according to claim 10, wherein:
the first voltage threshold is a portion of a voltage rating of the first capacitor.

15. The method according to claim 10, further comprising:
coupling, by a startup unit of the circuit, the first capacitor to the voltage rail and to the reference node;
estimating, by the startup unit, a voltage of the first capacitor in response to coupling the capacitor to the voltage rail and to the reference node; and
selectively coupling, by the startup unit, the first capacitor to the voltage rail and to the reference node based on the estimated voltage of the first capacitor.

16. A system comprising:
a rectifier configured to supply a rectified AC voltage to a voltage rail and a reference node;
a first capacitor configured to reduce an alternating current (AC) voltage ripple of the rectified AC voltage, the first capacitor being coupled to the voltage rail and to the reference node;
a first capacitor module configured to reduce the AC voltage ripple of the rectified AC voltage, the first capacitor module comprising:
a second capacitor; and
a first switching unit configured to operate in a closed state when a voltage between the voltage rail and the reference node does not exceed a first voltage threshold,
wherein the first switching unit couples the second capacitor in parallel with the first capacitor in the closed state of the first switching unit, and
wherein the first switching unit decouples the second capacitor from the first capacitor in an open state of the first switching unit;
a second capacitor module configured to reduce the AC voltage ripple of the rectified AC voltage, the second capacitor module comprising:
a third capacitor; and
a second switching unit configured to operate in a closed state when the voltage between the voltage rail and the reference node does not exceed a second voltage threshold,
wherein the second switching unit couples the third capacitor in parallel with the first capacitor in the closed state of the second switching unit, and
wherein the second switching unit decouples the third capacitor from the first capacitor in an open state of the second switching unit; and
a converter coupled to the voltage rail and to the reference node.

17. The system according to claim 16, wherein the converter comprises:
a switched-mode power converter configured to receive the rectified AC voltage at a first voltage and output a direct current (DC) voltage at a second voltage.

18. The system according to claim 17, further comprising:
a load coupled to the output of the switched-mode power converter, the load including an electronic device configured to operate at the second voltage.

* * * * *